(12) United States Patent
Barnes et al.

(10) Patent No.: US 11,010,892 B2
(45) Date of Patent: May 18, 2021

(54) DIGITAL PATHOLOGY SYSTEM AND ASSOCIATED WORKFLOW FOR PROVIDING VISUALIZED WHOLE-SLIDE IMAGE ANALYSIS

(71) Applicant: Ventana Medical Systems, Inc., Tucson, AZ (US)

(72) Inventors: Michael Barnes, Oro Valley, AZ (US); Joerg Bredno, San Francisco, CA (US); Srinivas Chukka, San Jose, CA (US); Christoph Guetter, Alameda, CA (US); Auranuch Lorsakul, Santa Clara, CA (US); Anindya Sarkar, Milpitas, CA (US); Ellen Suzue, Sunnyvale, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 99 days.

(21) Appl. No.: 16/378,462

(22) Filed: Apr. 8, 2019

(65) Prior Publication Data

US 2019/0236780 A1  Aug. 1, 2019

Related U.S. Application Data

(63) Continuation of application No. PCT/EP2017/075113, filed on Oct. 4, 2017.
(Continued)

(51) Int. Cl.
*G06T 7/00* (2017.01)
*G06K 9/00* (2006.01)
*G06T 7/11* (2017.01)

(52) U.S. Cl.
CPC ........ *G06T 7/0012* (2013.01); *G06K 9/00127* (2013.01); *G06T 7/11* (2017.01);
(Continued)

(58) Field of Classification Search
None
See application file for complete search history.

(56) References Cited

U.S. PATENT DOCUMENTS

| 8,897,537 B2 | 11/2014 | Cosatto et al. |
| 10,755,406 B2 | 8/2020 | Barnes et al. |

(Continued)

FOREIGN PATENT DOCUMENTS

| JP | 2013174823 A1 | 9/2013 |
| WO | 2013113707 A1 | 8/2013 |

(Continued)

OTHER PUBLICATIONS

International Search Report and Written Opinion dated Jan. 30, 2018 in corresponding PCT/EP2017/075113 filed Oct. 4, 2017, pp. 1-12.
(Continued)

*Primary Examiner* — Leon Flores
(74) *Attorney, Agent, or Firm* — Kilpatrick Townsend & Stockton LLP

(57) ABSTRACT

A digital pathology system and associated method and computer program product provide a quantitative analysis of entire tissue slides as well as intuitive, effective, fast, and precise quantification of biomarker expressions across relevant areas of the entire tissue slides. The digital pathology system enables a novel workflow that allows the user to efficiently outline clinically relevant morphology in its entirety, including solid tumor areas. Quantitative analysis results are then efficiently and intuitively provided to the user for all tissue content (i.e., millions of cells) within seconds. This efficiency is made possible by a pre-computation step that computes and stores image analysis results for later retrieval. Visualizing vast amount of data effectively is another component of the system that provides information and confidence to the user about the biomarker expression levels.

20 Claims, 25 Drawing Sheets
(19 of 25 Drawing Sheet(s) Filed in Color)

Related U.S. Application Data

(60) Provisional application No. 62/405,808, filed on Oct. 7, 2016.

(52) U.S. Cl.
CPC ............... *G06T 2207/10056* (2013.01); *G06T 2207/30024* (2013.01); *G06T 2207/30096* (2013.01); *G06T 2207/30168* (2013.01); *G06T 2207/30204* (2013.01)

(56) References Cited

U.S. PATENT DOCUMENTS

| | | | | |
|---|---|---|---|---|
| 2012/0147010 | A1* | 6/2012 | Schmidt | G16H 30/40 345/440 |
| 2014/0017233 | A1 | 1/2014 | Bias et al. | |
| 2015/0004630 | A1 | 1/2015 | Lange et al. | |
| 2015/0301732 | A1 | 10/2015 | Henderson et al. | |
| 2018/0253590 | A1* | 9/2018 | Lloyd | G01N 33/4833 |

FOREIGN PATENT DOCUMENTS

| | | |
|---|---|---|
| WO | 2014/131013 A1 | 8/2014 |
| WO | 2014140070 A2 | 9/2014 |
| WO | 2016/087592 A1 | 6/2016 |
| WO | 2016/107896 A1 | 7/2016 |
| WO | 2016120418 A1 | 8/2016 |

OTHER PUBLICATIONS

Office Action dated Mar. 25, 2020 in related foreign application No. JP 2019-513771, all pgs.

Office Action dated Jul. 14, 2020 in related foreign application No. JP 2019-513771, all pgs.

Notice of Allowance dated Oct. 21, 2020 in related foreign application No. JP 2019-513771, all pgs.

* cited by examiner

2111

2300

2323

2400 ns and entitled "Digital Pathology System and Associated Workflow for Providing Visualized Whole-Slide Image Analysis." The contents of all the aforementioned applications are hereby incorporated by reference in their entirety into this disclosure.

DIGITAL PATHOLOGY SYSTEM AND ASSOCIATED WORKFLOW FOR PROVIDING VISUALIZED WHOLE-SLIDE IMAGE ANALYSIS

RELATED APPLICATIONS

This patent application is a continuation of International Patent Application No. PCT/EP2017/075113 filed Oct. 4, 2017, which claims priority to and the benefit of U.S. Provisional Application No. 62/405,808, filed Oct. 7, 2016, and entitled "Digital Pathology System and Associated Workflow for Providing Visualized Whole-Slide Image Analysis." The contents of all the aforementioned applications are hereby incorporated by reference in their entirety into this disclosure.

TECHNICAL FIELD

The present disclosure generally relates to a digital pathology system that hosts a workflow for providing a quantitative analysis of whole-slide images as well as intuitive visualization thereof.

BACKGROUND

Digital pathology equipment is often used to produce digital images of microscope slides. Pathologists and histo-technologists often visually examine the digital images to obtain information about tissue samples and to identify the most appropriate treatment to improve a clinical outcome.

Current digital pathology image analysis systems are increasingly expected to analyze large amounts of high-resolution digital images of tissue slides or "virtual slides." The digital image analysis has proven to be computationally intensive, requiring significant storage, and lessening the ability for real time diagnostic and interaction execution.

In addition, a conventional digital pathology system typically analyzes one or more small areas of the digital slide, generally referred to as fields of view (FOVs). Such partitioning of the digital slide forces the user or pathologist to contribute significant mental effort into approximating the correct solution by carefully selecting those FOVs that are more likely to represent the information of the entire tissue affixed to the slide.

Despite their potential advantages, current digital pathology systems have not achieved the desired efficiency in providing an expeditious, real time quantitative analysis of entire tissue slides as well as intuitive visualization thereof.

For example, conventional digital imaging systems with limited processing power restrict the size of each field of view to approximately 1,000 to 2,500 pixels, a small fraction of the whole slide image that can contain, for example, 60,000 to 110,000 pixels, and occupy, for example, between 0.5 GB and 1.5 GB of memory space.

BRIEF SUMMARY

It is anticipated that whole-slide image analyses will become widely adapted in automated image analyses for therapeutic, prognostic, or diagnostic decision support. As a result, the present disclosure describes an efficient whole-slide image analysis workflow for use in a digital pathology system to perform quantitative analysis of the entire tissue slides as well as intuitive visualization.

More particularly, the disclosed workflow effectively provides precise, visual quantification of biomarker expressions to aid pathologists in providing accurate in-vitro diagnostics.

The digital pathology system provides automated digital slide creation, management, analysis, and viewing. It can be used for in vitro diagnostic as an aid to the pathologist in the display, detection, counting, review, and classification of tissues and cells of clinical interest based on particular morphology, color, intensity, size, pattern, and shape.

The workflow of the digital pathology system can automatically outline, or enable the user, such as a pathologist, to efficiently outline clinically relevant morphology (e.g., one or more solid tumor areas) over the entire slide containing the tissue sample. The quantitative analysis result can then efficiently and intuitively be provided to the user for the entire outlined clinically relevant morphology (which in some cases may contain thousands or millions of cells) within seconds. Furthermore, the present workflow enables the visualization of this vast amount of data effectively, which significantly improves the diagnostic and which provides information and confidence to the user about the biomarker expression levels.

The present workflow may reside on a workflow module. It may be executed on a remote or local pathology workstation, and may act as an interface with the user. The workflow may start by preparing a whole-slide image (or images) before the user starts analyzing a case. To this end, the digital pathology system may acquire a scanned digital image of the entire slide that can be viewed and assessed by the user at various magnification levels.

In one embodiment, the user reviews the whole-slide image and manually separates relevant from non-relevant areas in the whole-slide image. To this end, the user resorts to the digital pathology system to manually select one or more relevant areas, for example, by outlining the relevant areas using an input device such as a mouse or using a finger in case of a touch-sensitive display. Each outlined relevant area may be viewed at different magnification levels. The selected relevant areas are also referred to herein as "whole tumor areas" or "clinically relevant morphology," to signify the ability to include within the selected relevant areas entire tumor areas along with optional surrounding regions of interest.

It should be amply clear that the user is no longer restricted by specific geometric shapes, such as a rectangle, for defining and selecting the relevant areas of interest in the tissue sample. Rather, the present digital pathology system enables the user to perform a freehand selection of large relevant areas in the tissue sample, by outlining the relevant areas, such as by manually sketching a boundary around the relevant areas of interest.

It should also be understood that other manual selection methods might be used. As an example, the user is enabled to annotate the whole-slide digital image in order to specify the areas of interest that require scoring. Alternatively, the selection process of the relevant areas could be performed automatically by the digital pathology system.

Once the step of selecting the relevant areas is completed, the user invokes an image analysis module that initiates an image analysis algorithm of the selected relevant areas. The image analysis module provides clinical scores based on cell detection and classification, for example, in the form of a percent positive immune cell score. In one embodiment, the clinical scores range between 0 and 100, with "0" indicating no expression of one or more biomarkers of interest expression and "100" indicating full expression of one or more biomarkers of interest. The scoring results represent large amounts of biological information, such as diagnostics (positive/negative) or informing treatment decisions.

A visualization module prepares computer-generated overlays of the image analysis results, and provides the user with a user-friendly visual rendering of the scoring results atop the originally selected whole-slide image, as a representation of density. The overlays can represent one or more maps, such as a heat map, a location map, a correlation map, etc., and can show variations of information using color and/or lines depending on the application.

Upon reviewing the visual rendering by the visualization module, the user can optionally invoke an artefact extraction module for removing undesired artefacts, such as folds, stroma separation artefact, speckling, blank areas (i.e., areas where substantially no tissue is present), etc. The artefacts removal might be implemented either manually by outlining the artefacts, or by resorting to an automated method that detects, visualizes, and excludes the artefact areas from the visual rendering.

The user can further optionally invoke a tissue content extraction module for removing undesired tissue or staining content, such as anthracotic pigment, necrosis, intra-vascular neutrophils, etc. The tissue or staining content removal might be implemented by either manually outlining the areas of interest, or by employing an automated method of tissue content detection and extraction.

The visual rendering will therefore represent large, accurate, and specific biological information pertaining to the clinically relevant areas that are selected by the user, such as solid tumor areas, but excludes data considered by the user to be extraneous, such as necrosis, and various artefacts and tissue content. The visual rendering is expected to assist a qualified pathologist in providing a more accurate diagnostic interpretation.

The user then decides whether to accept the visual rendering or to manually override it either partially or in its entirety. If override is selected, the results of any one or more of the image analysis module, the artefact extraction module, and the tissue content extraction module, can be selectively disregarded, and the user is provided with the ability to manually enter the final scores the he or she derives from the assessment of the visual rendering provided by the visualization module.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various features of the present disclosure and the manner of attaining them will be described in greater detail with reference to the following description, claims, and drawings wherein:

It will be appreciated that for simplicity and clarity of illustration, reference numbers may be reused among the figures to indicate corresponding or analogous features.

DETAILED DESCRIPTION

Figure 1:
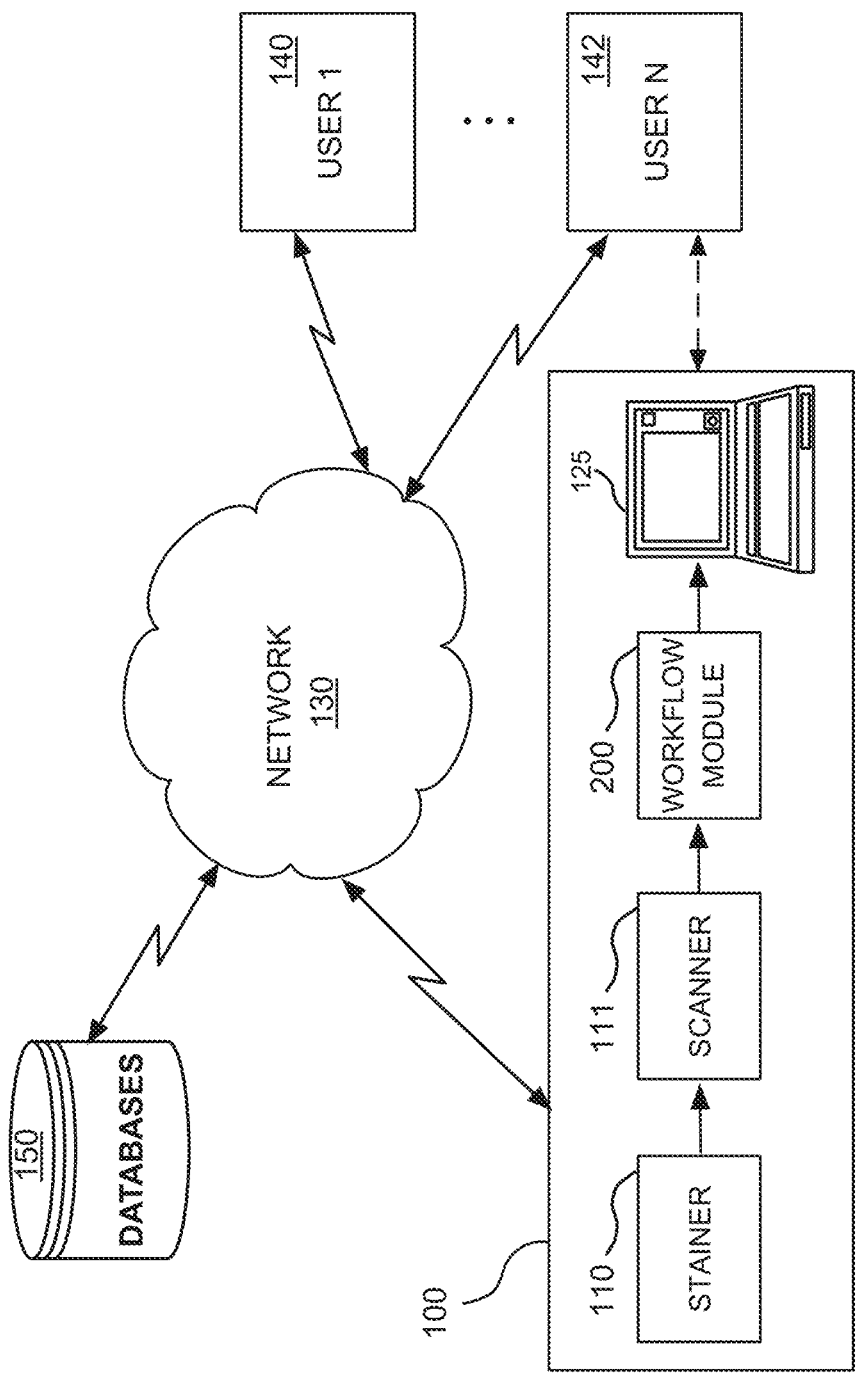
FIG. 1 illustrates an exemplary computer-based digital pathology system that operates in a network environment and that hosts a workflow residing on a workflow module, for providing a visual quantitative analysis of a whole-slide image as well as intuitive visualization of the quantification of biomarker expressions, in accordance with one embodiment of the present disclosure.

FIG. 1 illustrates a computer-based digital pathology system 100 that operates in a network environment for providing a visual quantitative analysis of a whole-slide image as well as intuitive visualization of the quantification of biomarker expressions, in accordance with one embodiment of the present disclosure. The digital pathology system 100 interfaces with a plurality of client computer systems (or user stations) 140, 142 over a network 130.

The digital pathology system 100 may include, among other things, a stainer 110, a scanner 111, a workflow module 200 and a processor or computer 125. The users of the client computer systems 140, 142, such as pathologists, histotechnologists, or like professionals, may be able to access, view, and interface with the outputs of the scanner 111 and workflow module 200 on a real time basis, either remotely or locally. These outputs may alternatively be stored and accessed on networked databases 150.

As further detailed in FIG. 2, the workflow module 200 may generally include an image analysis module 210, a visualization module 220, an artefact extraction module 230, and a tissue content extraction module 240, the operation of which will be described in more detail.

Figure 3:
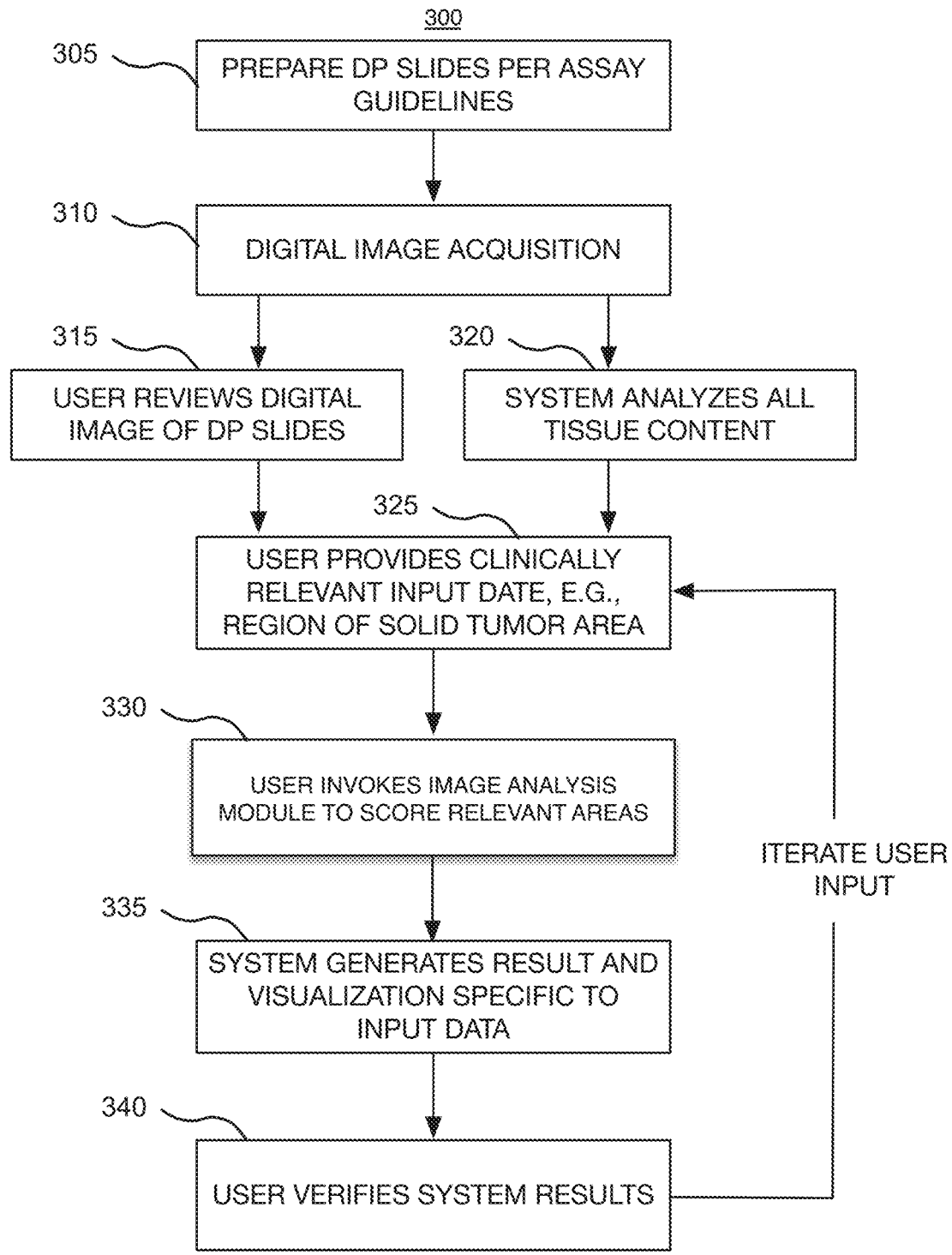
FIG. 3 is an exemplary high level flow chart that illustrates the overall operation of the workflow module of FIGS. 1 and 2, for enabling users to efficiently outline clinically relevant morphology, including all solid tumor areas, across the whole-slide image, in accordance with one embodiment of the present disclosure.

The workflow module 200 may host a workflow 300 (FIG. 3) that is executed on the processor 125 and on one or more user stations 140, 142. The workflow 300 starts at step 305 by preparing a digital pathology slide (or slides) pursuant to the appropriate assay guidelines, including staining the tissue sample. In an exemplary implementation, images are acquired of one or more microscope glass slides containing tissue sections (e.g., formalin-fixed, paraffin-embedded (FFPE) tissue sections) that have been stained using, for example, immunohistochemical (IHC) staining, for the presence of PD-L1 protein, by employing the PD-L1 (SP142) assay developed by Ventana Medical Systems, Inc. The IHC slide can be stained, for example, on a BenchMark ULTRA stainer 110, also a product of Ventana Medical Systems, Inc. In addition to the IHC slide, in some embodiments, additional digital images may be acquired of slides containing adjacent tissue sections of the same tissue block can be stained with other IHC stains, a hematoxylin and eosin (H&E) stain, or using other types of staining techniques.

Figure 5:
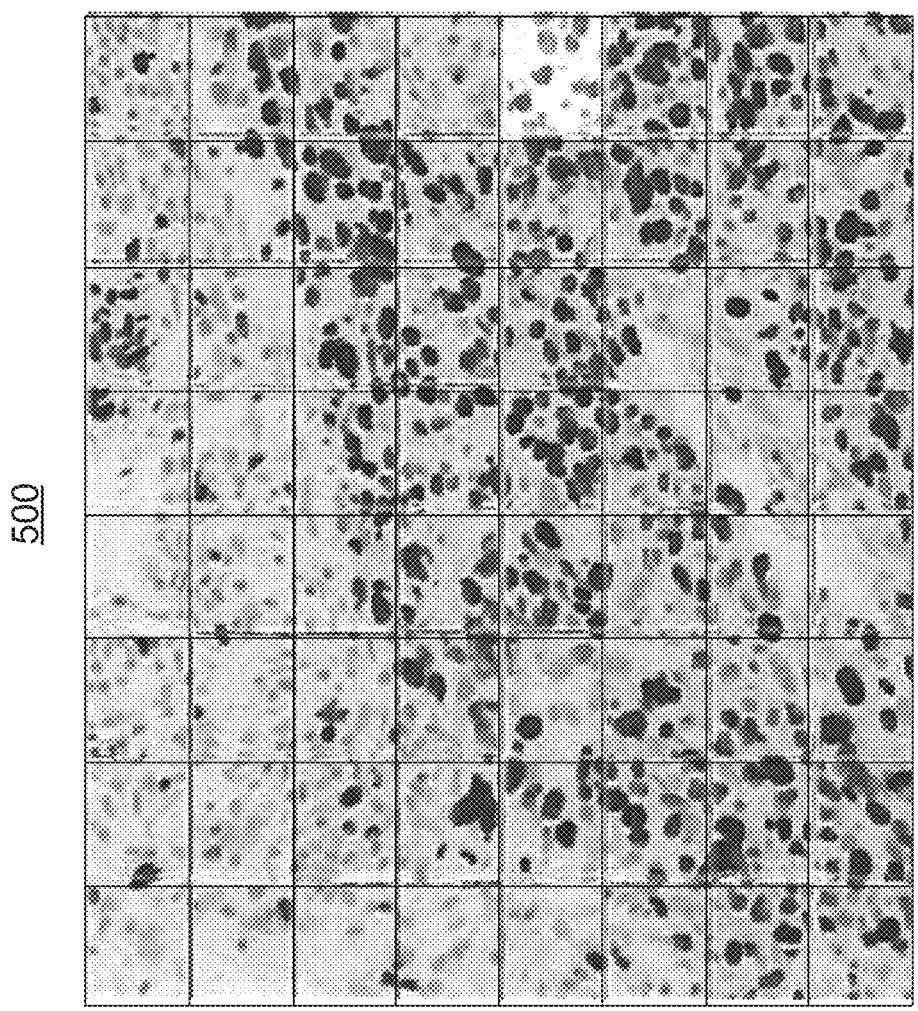
FIG. 5 illustrates an exemplary whole-slide image generated by a scanner that forms part of the digital pathology system of FIG. 1.

At step 310, the scanner 111 acquires a whole-slide image (or images) 500 (FIG. 5) of the sample tissue, before the user starts analyzing a case. The scanned digital image 500 can be viewed and assessed by the user at various magnification levels. For example, the slide can be loaded into a VENTANA iScan HT whole-slide scanner 111 that can generate the digital image 500 of the specimen in monochrome or multiple color channels. This digital image 500 may be stored, for example, in the databases 150. The batch control can also be scanned and available for review.

At step 315, the user may review the digital image of a relevant area (or clinically relevant morphology) 610 (FIG. 6), without the benefit of the image analysis provided by the workflow module 200. FIGS. 6 through 9 illustrate various screen shots 600, 700, 800, 900 of this relevant area 610, using different magnification levels, prior to the invocation of the workflow module 200 of FIGS. 1 and 2. While the user reviews the digital images 600, he or she will begin to formulate overall positivity of the slide and to assess the relevancy of the stained cells. The user then defines (or identifies) relevant areas, such as tumor areas, and annotates the whole-slide image 500 accordingly. In some embodiments, the relevant areas may be identified automatically, without the user's input, as described in other parts of the present disclosure.

The image analysis module 210 of the workflow module 200 can independently analyze, at step 320, the content over the entire slide. In some embodiments, analyzing "the entire slide" can mean analyzing all areas of the slide containing at least some tissue. That is, in some embodiments, analyzing the entire slide can include automatically detecting areas, within the whole-slide image, that contain no tissue (i.e., no biological material), excluding such areas from the analysis, and analyzing only those areas that contain at least some tissue.

The image analysis module 210 can provide initial clinical scores based on cell detection and classification in the form of a percent positive immune cell score. In a preferred embodiment, the clinical scores range between 0 and 100, with "0" indicating no expression of one or more biomarkers of interest expression and "100" indicating full expression of one or more biomarkers of interest. The scoring results represent large amounts of biological information, such as cell type, location, density, formation, etc.

As it will be explained later in greater detail, in connection with FIGS. 21 through 26, the visualization module 220 prepares computer-generated overlays of the image analysis results, and provides the user with a user-friendly visual rendering (or overlay) 1100 (FIG. 11) of the scoring results atop the originally selected whole-slide image, as a representation of the density of the biomarker expressions across the selected clinically relevant morphology. The overlays can represent one or more maps, such as a heat map, a location map, a correlation map, etc., and can show variations of information depending on the application. More specifically, the workflow module 200 provides a quantitative analysis of entire tissue slides as well as intuitive visualization thereof, including precise, visual quantification of biomarker expressions.

The image analysis module 210 analyses the entire slide offline, typically immediately after the image is scanned and becomes available to the image analysis module 210. The analysis may include determining locations of all objects of interest (e.g., cells) within the slide, classifying them (i.e., determining their type), and storing the location and classification data, along with any other information related to the objects of interest, in databases 150.

Figure 10:
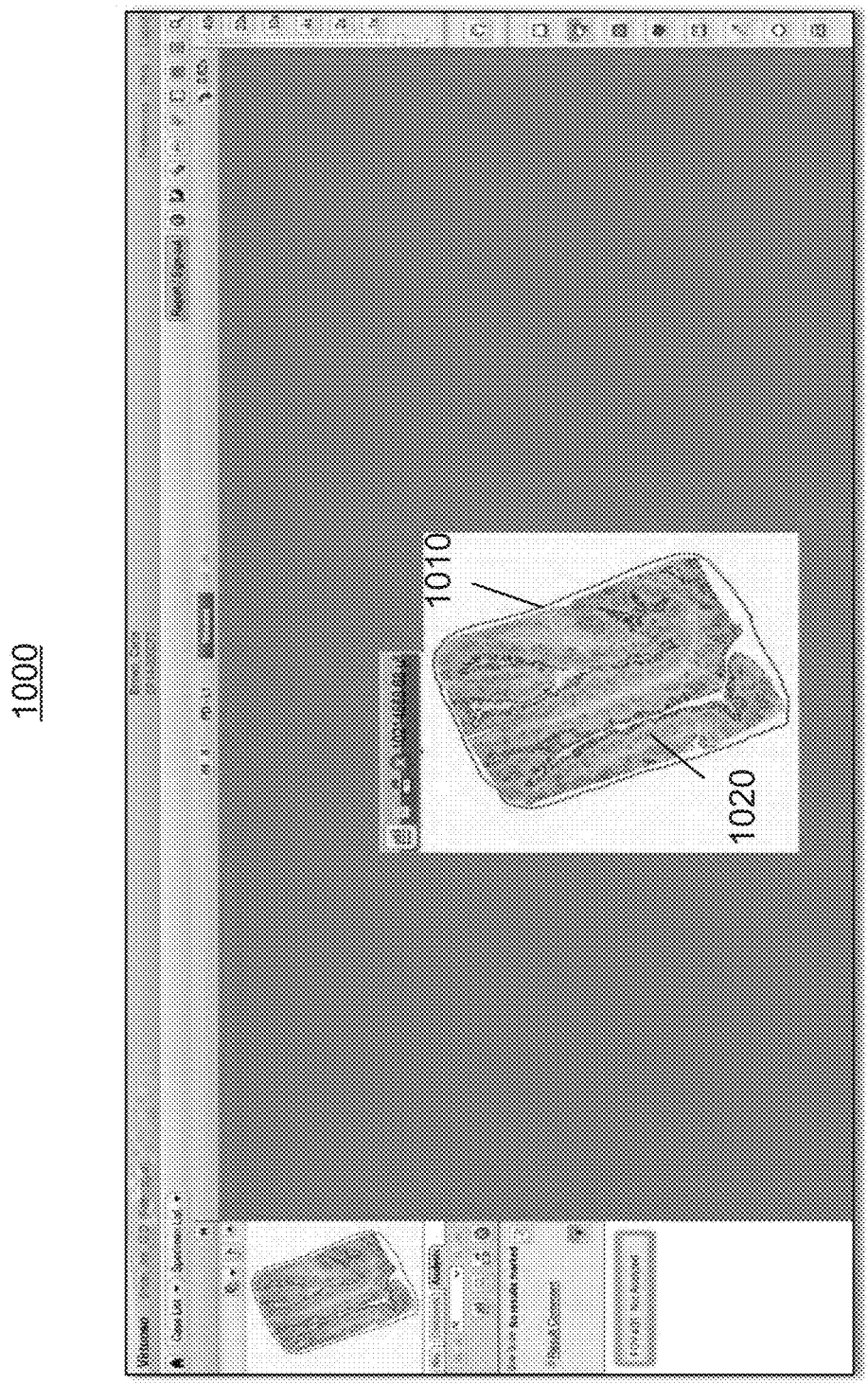
FIG. 10 is a screen shot illustrating exemplary annotations added by the user to capture clinically relevant morphology or relevant areas within the whole-slide image of FIGS. 6-9, in preparation for invoking the workflow module of FIGS. 1 and 2.

Depending on the size of the entire slide, the amount information that it contains, and the processing power of the analysis module 210, the above-described analysis of the entire slide may take significant time, sometimes as long as 10 minutes or longer. Accordingly, doing this analysis "offline" (i.e., beginning the analysis as soon as the slide image is scanned and before the slide is requested by the user) may enable the analysis to be complete by the time the user accesses the analysis for the first time for review and annotation. The image analysis module 210 anticipates the user's interaction with the resulting analysis, such as by adding annotations, e.g., drawing a boundary 1010 around the relevant clinically relevant morphology 1020 (FIG. 10).

Consequently, by the time that the user starts interacting with the resulting analysis, all computationally intensive steps such as locating and classifying cells can be completed with the results being stored in databases 150, in which case the image analysis module 210 may only need to load the pre-calculated information from databases 150, and perform quantification operations, e.g., quantifying the cells of certain types within the selected clinically relevant morphology. Such quantification operations may be performed quickly enough to provide the user with "real-time" experience where the quantification results become visible within a very short time (e.g., within a second or within a few seconds).

In some embodiments, as part of the offline analysis, image analysis module 210 may also generate and store in databases 150 one or more whole-slide overlay images corresponding to the identified objects (e.g., cells) of different types. This way, when the user selects a region of clinically relevant morphology, image analysis module 210, instead of generating the overlay image(s), may load pre-generated overlay image(s) from databases 150, and display the portion of the overlay image(s) that correspond to the selected region of clinically relevant morphology.

At step 325 of the workflow 300, the user compares the annotated whole-slide image 500 (step 315) with the scored visual rendering 1100 (step 320) by, for example, toggling the heat map overlays ON and OFF and by comparing the overall slide scores of the visual rendering 1100 at multiple magnifications. As shown in the screen shot 1000 of FIG. 10, the user then annotates relevant areas of interest 1020 on the visual rendering 1000, such as by drawing a contour 1010 around the relevant areas 1020 (e.g., solid tumor areas and surrounding regions).

The contour 1010 represents an instruction to the workflow module 200 to exclusively limit the analysis to the relevant areas 1020 within the contour 1010. Since the workflow 300 requires assessment on a whole tumor level, the user's annotations are drawn to capture all relevant or suspect tumor areas. The user may need to refer back to the negative control or H&E in order to continue refining his or her understanding of the relevant areas to encompass within the contour 1010. If certain areas are irrelevant to the whole slide score, such as large areas of necrosis, the user can annotate the rendering 1000, or alternatively use one or more exclusion fields of view, to remove those nonrelevant areas from the analysis. Alternatively, the original contour 1010 can be redrawn.

At step 330, the user invokes the image analysis algorithm that is embedded on the image analysis module 210 of the workflow module 200, and forwards the user annotations 1010 thereto, in order to instruct the image analysis module 210 and the visualization module 220 to limit the analysis and rendering exclusively to the annotated relevant areas 1020, thus minimizing processing and rendering time, and expediting the analysis process.

Figure 6:
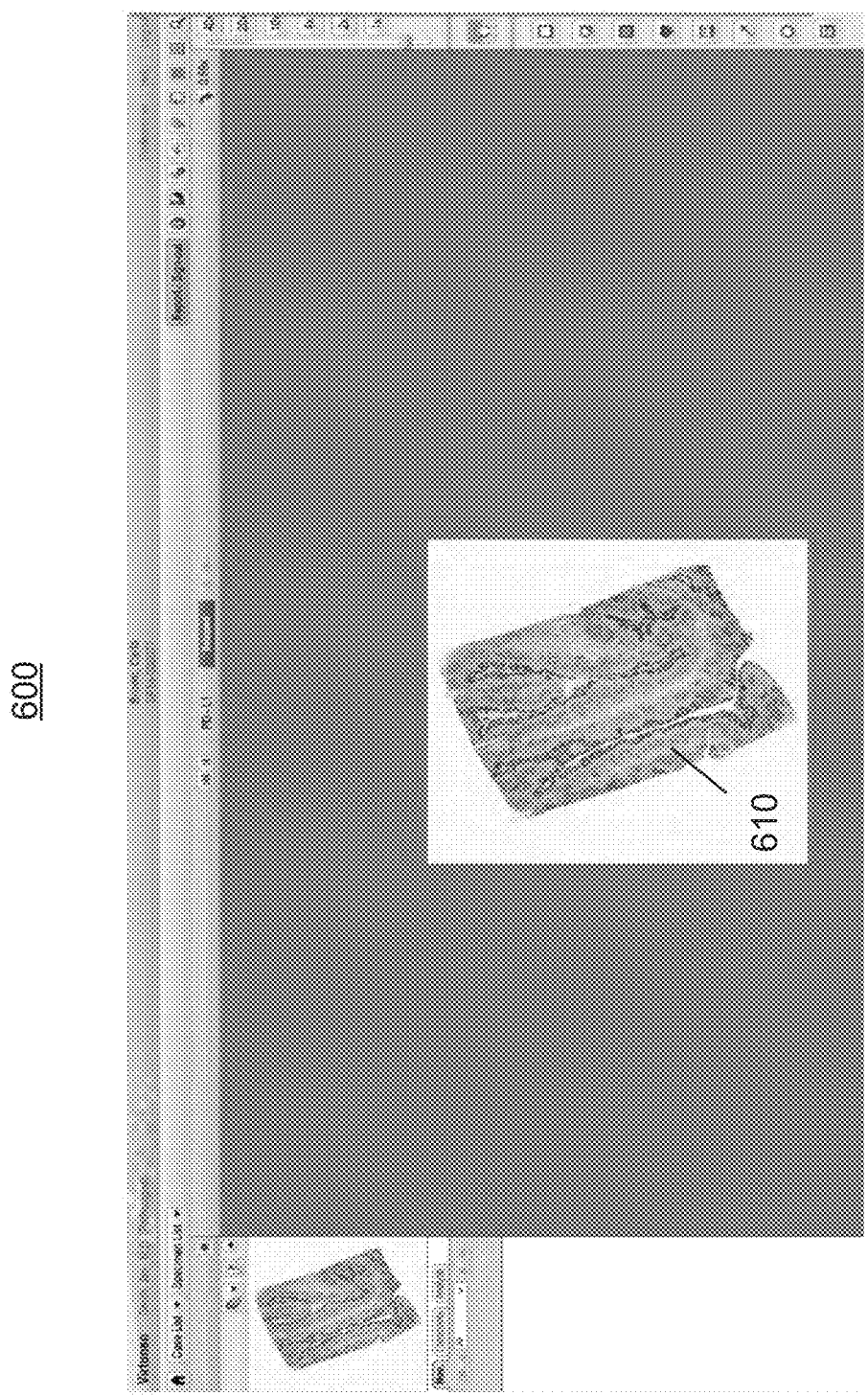
FIGS. 6 through 9 are exemplary screen shots of the whole-slide image shown in FIG. 5, illustrating the viewing environment, using different magnification powers, prior to invoking the workflow module of FIGS. 1 and 2.
Figure 7:
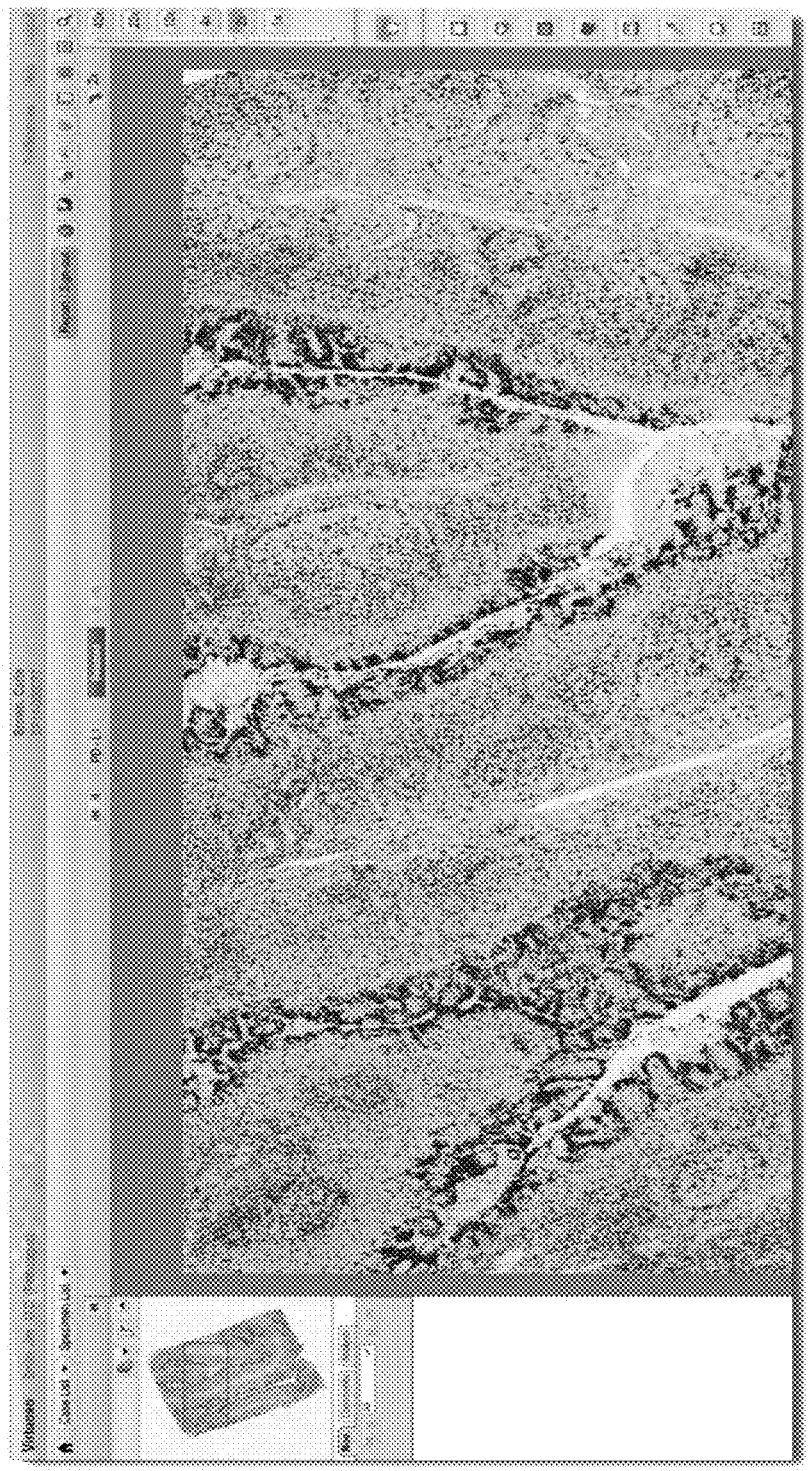
Figure 8:
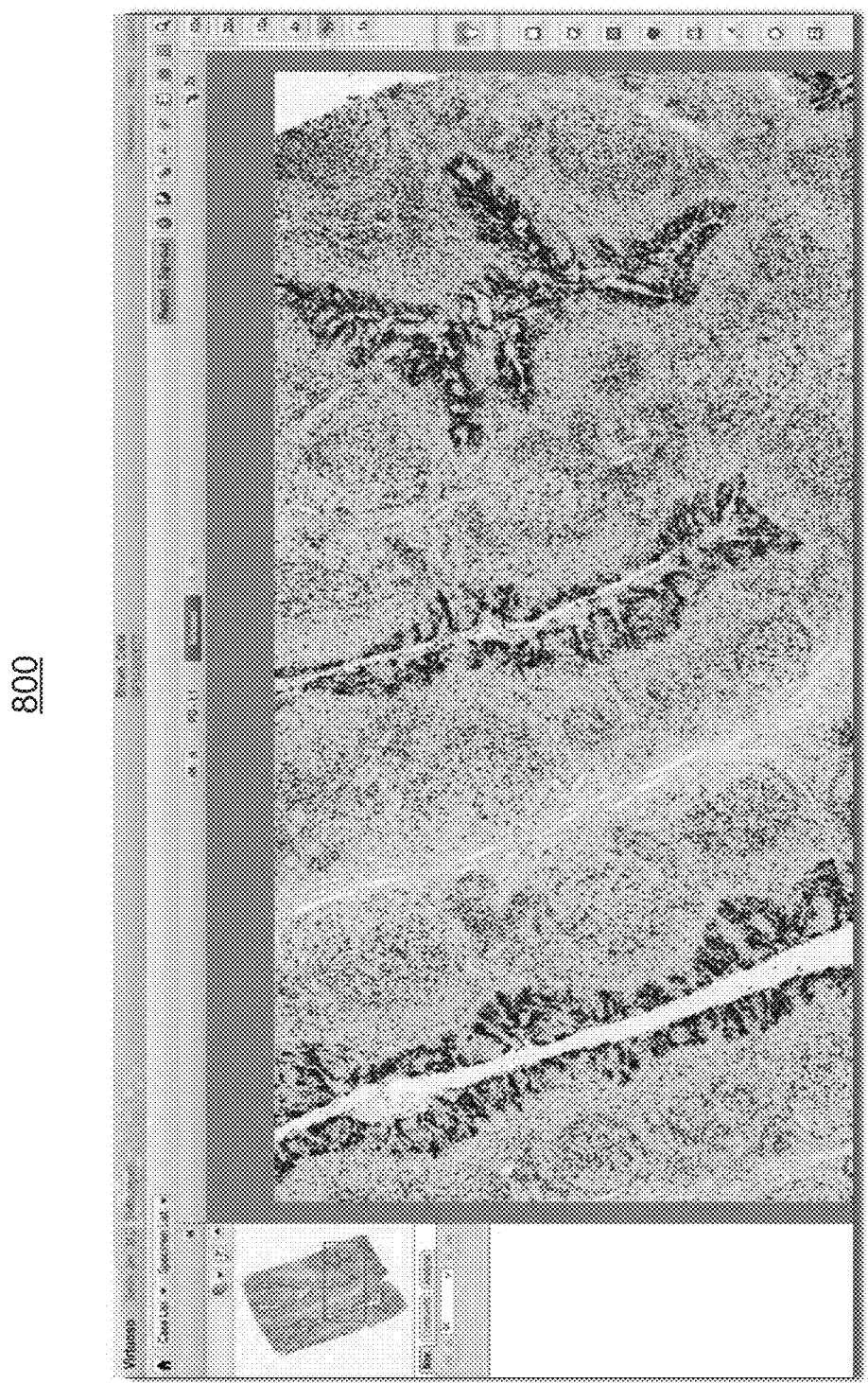
Figure 9:
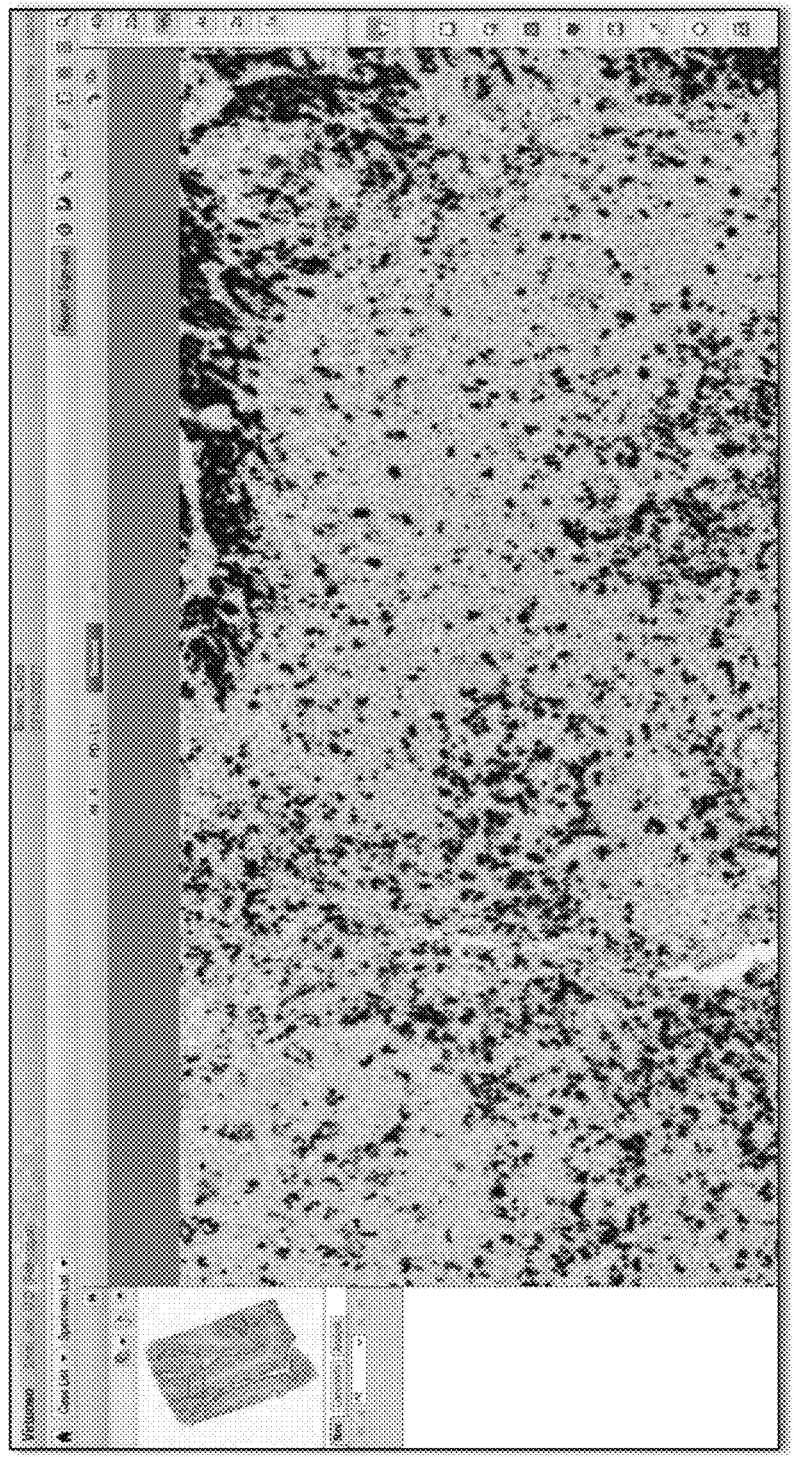

At step 335, the workflow module 200 responds to the user's invocation by generating two main pieces of information for user review against the digital image rendering of a relevant area 610 (FIG. 6). The first piece of information includes an overlay 1120 (FIG. 11) wherein the workflow module 200 shows the locations of the positive PD-L1 immune cells. This data is based on the single cell classification level, so when any particular area has a high density of positive IC, the color coalesces to form the area visualized at low magnification power. As the user views the annotation overlay 1120 on higher power, individual dots mark the individual classified cells, giving the user the ability to understand the whole slide pattern at low magnification power and also to understand the individual cell results on high magnification power, for a very granular comparison.

Figure 12:
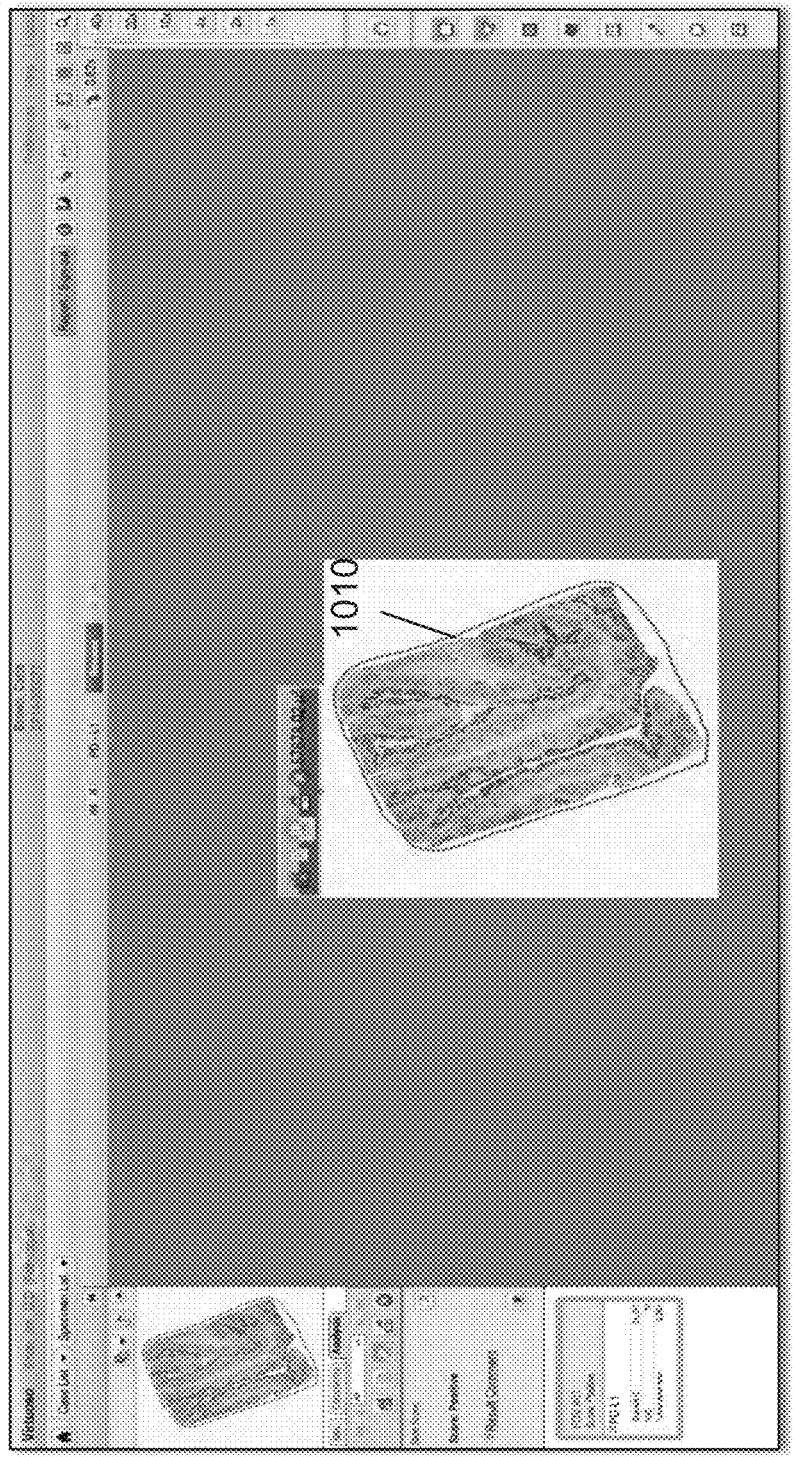
FIGS. 12 through 14 are exemplary screen shots illustrating the ability provided to the user by the workflow module, to toggle between the visual rendering of FIG. 11 and the annotated view of FIG. 10, at varying power magnification levels, in order to provide the user with the ability to compare the views and to better assess the analysis provided by the workflow module of FIGS. 1 and 2.
Figure 13:
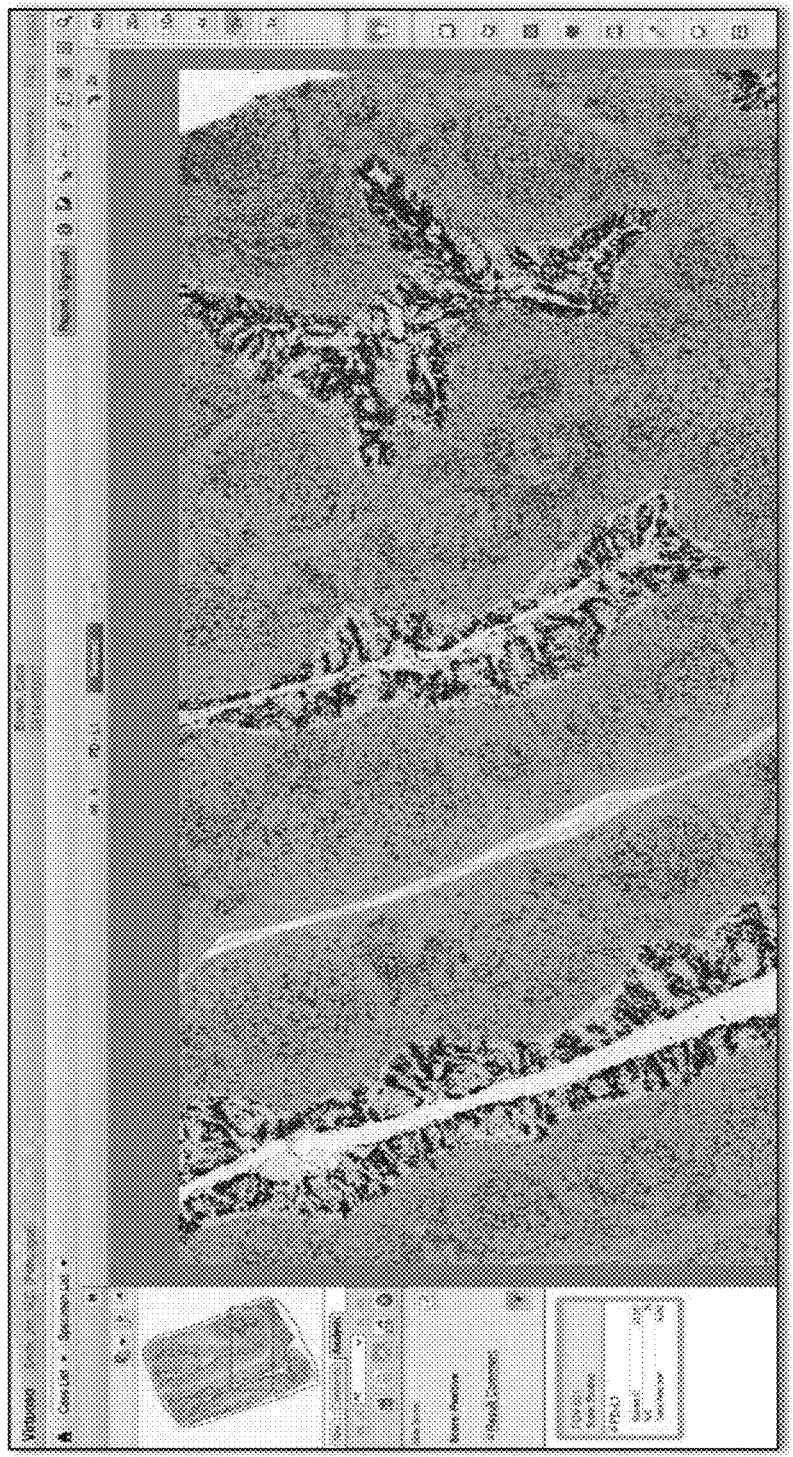
Figure 14:
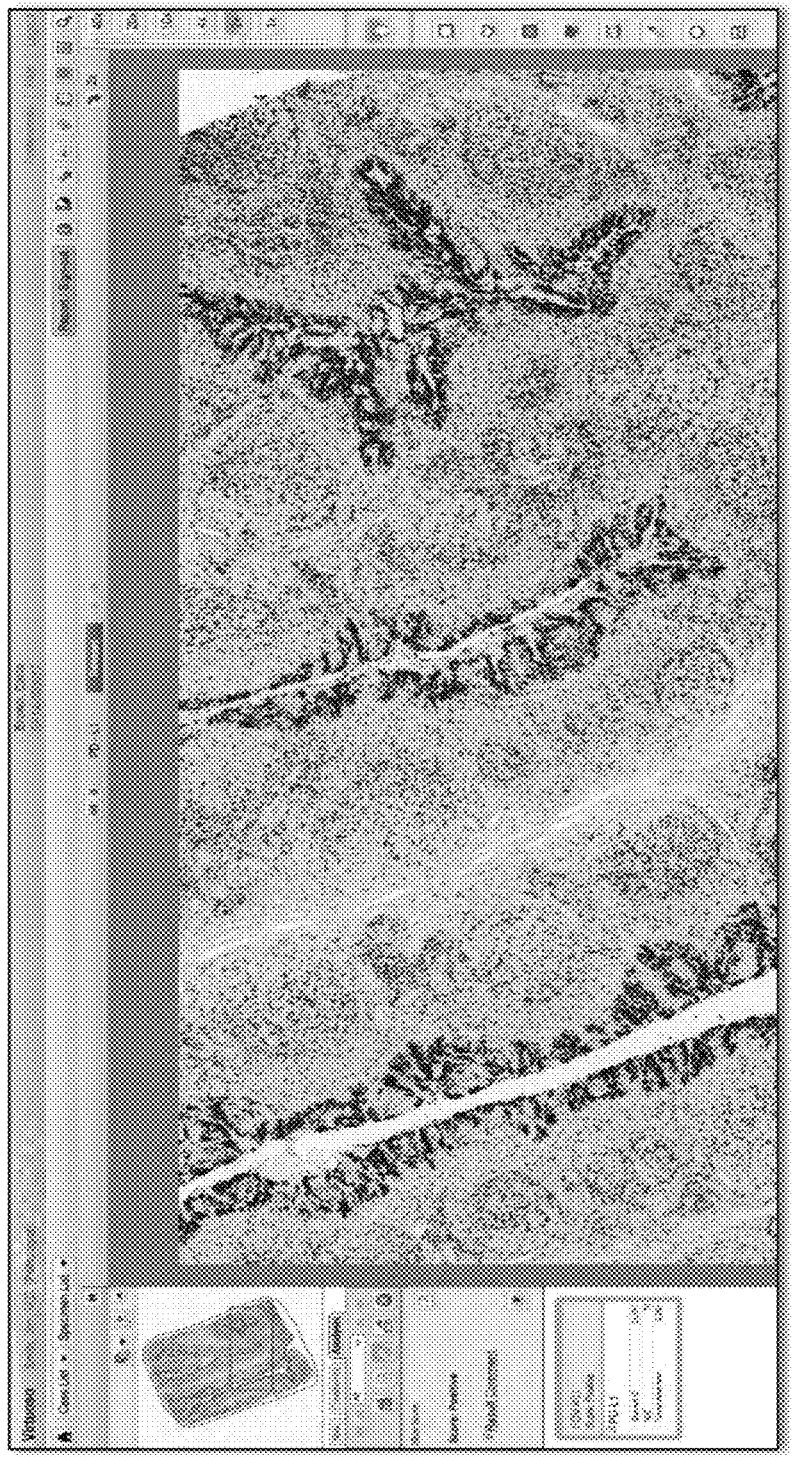

As further illustrated in the screen shot 1200 of FIG. 12, this annotation overlay 1120 can be toggled ON and OFF, allowing the user to compare the digital image rendering 1200 which is devoid of image analysis, with the digital image rendering 1100 that contains the image analysis of the present disclosure, at low and high magnification levels. Reference is made to screen shots 1300, 1400 of FIGS. 13, 14, respectively. This allows the user to understand how the workflow module 200 classifies cells at high magnification power as well as the overall pattern of staining at low magnification power.

Figure 11:
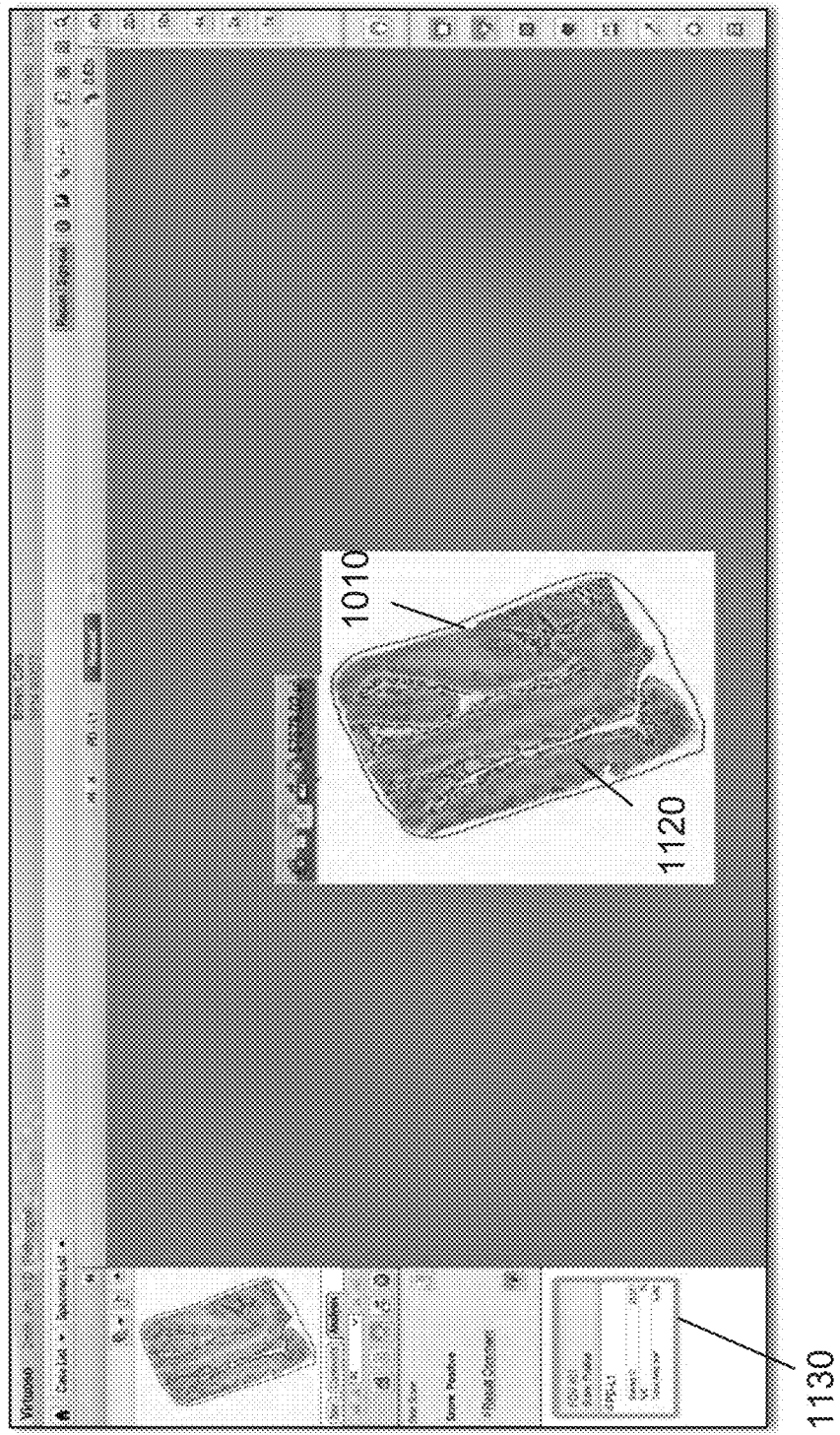
FIG. 11 is an exemplary screen shot illustrating a visual rendering of the analysis performed by the workflow module of FIGS. 1 and 2, which provides the user with overlays that assist the user with the understanding of the whole slide pattern at low power magnification, as well as the understanding of the individual cell results at high power magnification, and which further provides the user with a quantitative scoring pattern of the relevant areas of FIG. 10.

The second piece of information that is provided by the workflow module 200, enables the user to compare the image analysis results against an overall slide metrics (or scores) 1130 (shown in the left margin of the screen shot 1100 of FIG. 11). The image analysis module 210 generates the overall quantitative score which is the cumulative proportion of positive immune cell area to the total relevant tumor area, and which is represented as a percentage. This calculation is the same process as one performs for the assay. In addition, the image analysis module 210 also indicates two other metrics including the total count of positive immune cells and the total tumor area. The immune cells count is converted to an area concept based on the average size of lymphocytes as well as other relevant immune cell metrics (i.e., macrophages).

Figure 15:
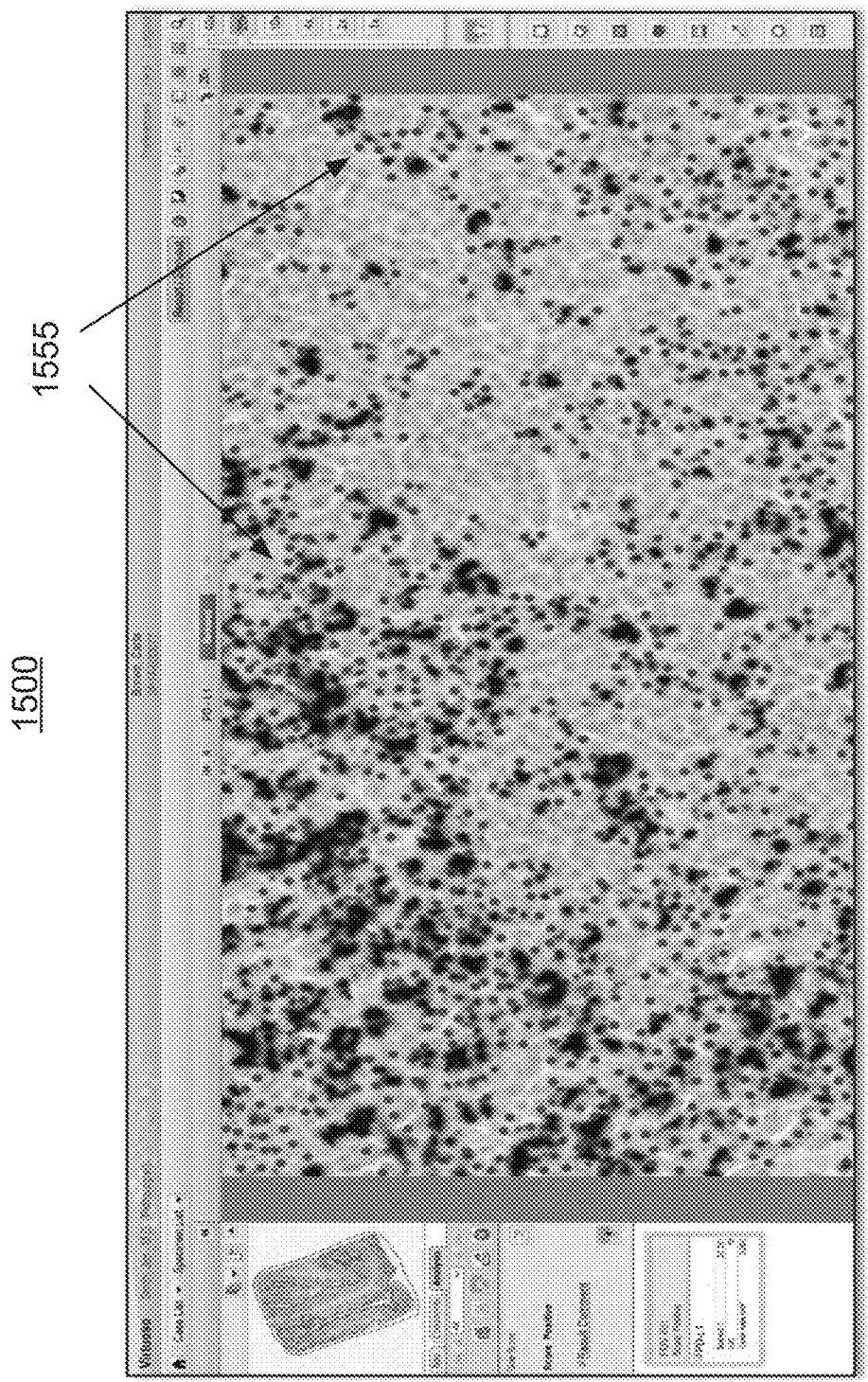
FIG. 15 is an exemplary screen shot illustrating a high power magnification view of a designated clinically relevant morphology within the visual rendering of FIG. 11, wherein individual dots in the overlays mark individual classified cells, thus enabling the user to understand the whole slide pattern at a low magnification power and the individual cell results at a high magnification power for a very granular comparison.

With reference to the screen shot 1500 of FIG. 15, as the user views the annotation overlay 1120 of FIG. 11, on a higher magnification power, individual dots 1555 mark the individual classified cells, giving the user the ability to understand the whole slide pattern at a low magnification power, and also to understand the individual cell results on a high magnification power, for a very granular comparison.

Figure 16:
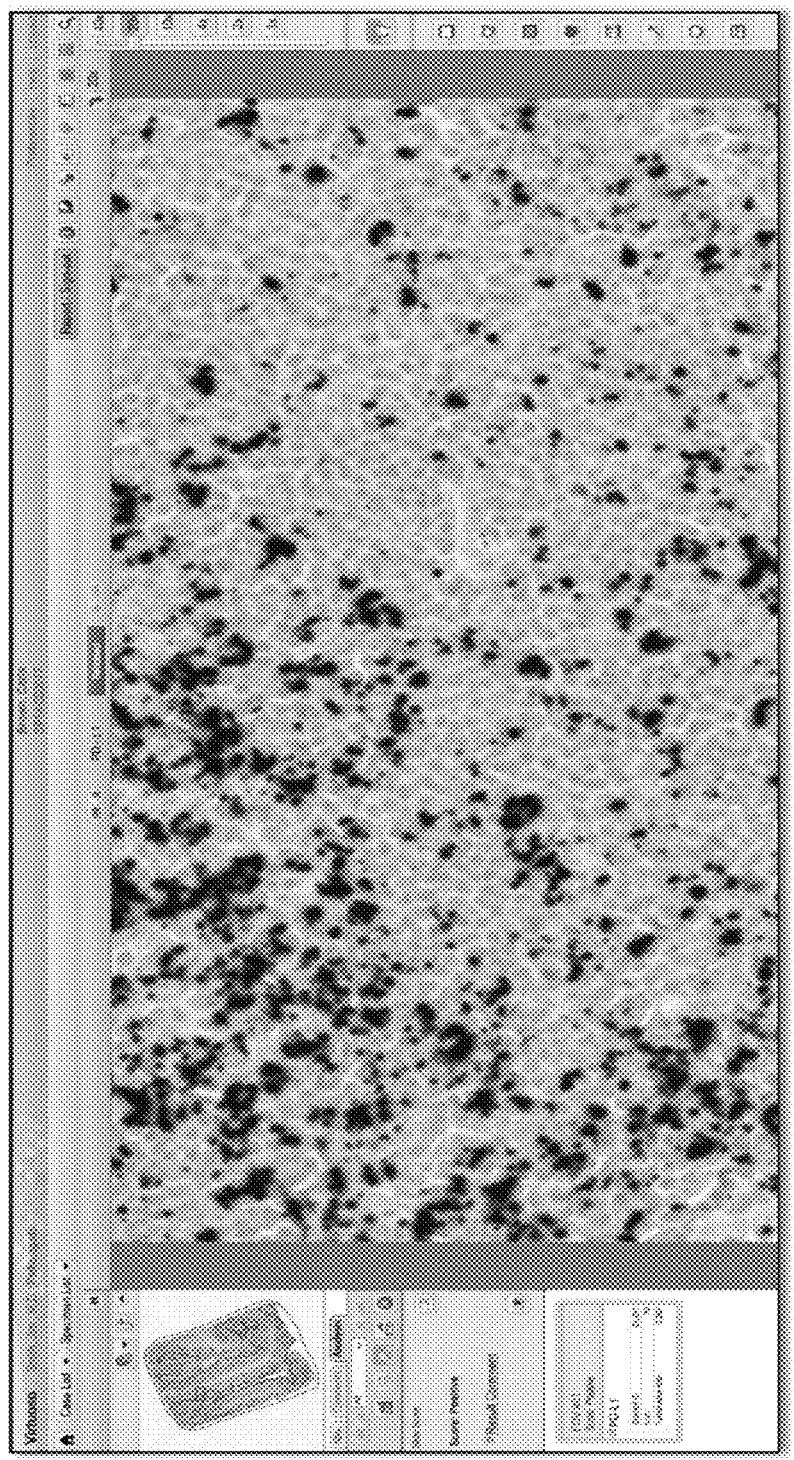
FIG. 16 is an exemplary screen shot of the same clinically relevant morphology of FIG. 15, with the overlays being toggled OFF, to allow for a better appreciation of the visual rendering by the workflow module of FIGS. 1 and 2.
Figure 17:
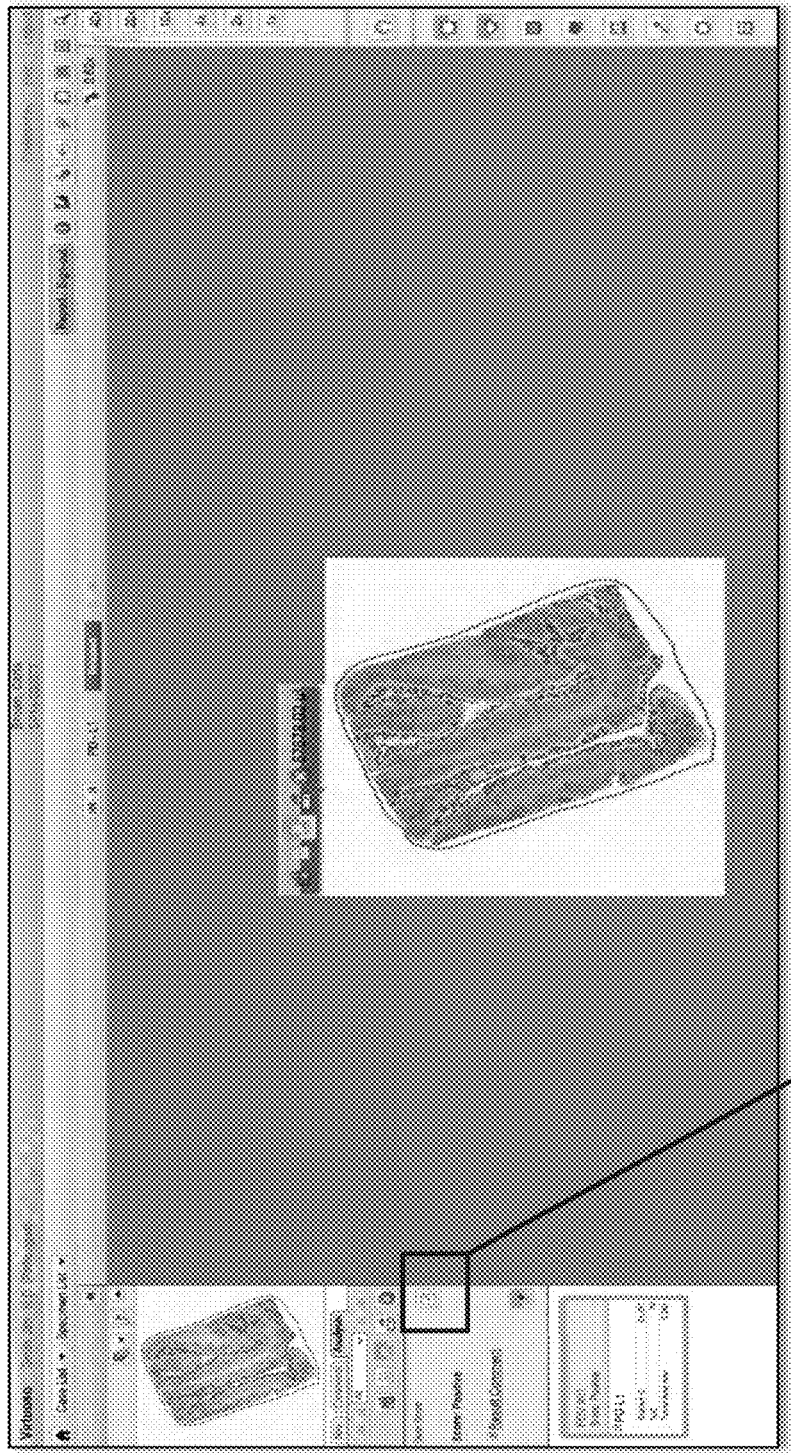
FIG. 17 is an exemplary screen shot of the analysis rendering of FIG. 11, providing the user with the ability to either accept, override, or modify the scoring assessment by the workflow module of FIGS. 1 and 2.

As further illustrated in the screen shot 1600 FIG. 16, the annotation overlay 1120, including the individual dots 1555, can be toggled ON and OFF, allowing the user to compare the digital image rendering 1200 which is devoid of image analysis, with the digital image rendering 1100 that contains the image analysis of the present disclosure, at low and high magnification levels. This enables the user to understand how the image analysis module 210 classifies cells at higher magnification levels as well as the overall pattern of staining at lower magnification levels.

At step 340, following the foregoing user comparative review, the user determines whether to accept the results generated by the workflow module 200, at step 335, or whether to manually revise or override these results.

If override or revision is chosen and actually performed by the user, the workflow 300 proceeds to step 325, and continues to iterate the user input until the user is fully satisfied with the final digital rendering. The final digital rendering can then be used by a professional practitioner for the intended purpose. The user will then sign out the case, and the selected results provided by the workflow module 200 are incorporated into a report.

Figure 18:
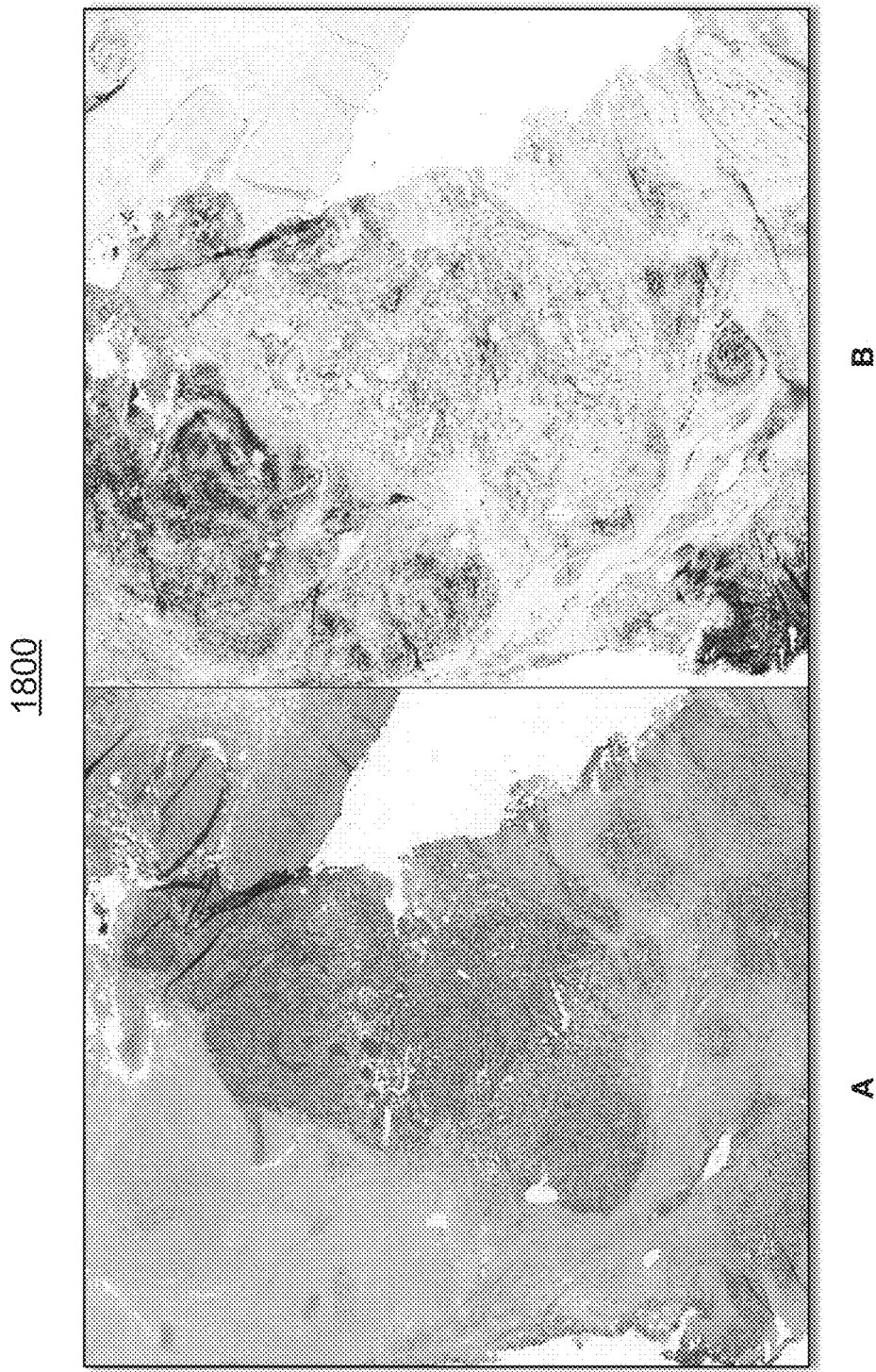
FIG. 18 is an exemplary side-by-side comparison view of H&E (A) and PD-L1 (B) screen shot images, visualizing biomarker expressions in tumor exemplary samples, with image (B) showing an overlay on a PD-L1 bladder, wherein positive areas are represented by colored dots.

FIG. 18 is a side-by-side exemplary comparison view of H&E (A) and PD-L1 (B) screen shot images 1800(A) and 1800(B), visualizing biomarker expressions in tumor exemplary samples, with image (B) showing an overlay on a PD-L1 bladder, wherein positive areas are represented by colored dots.

Figure 19:
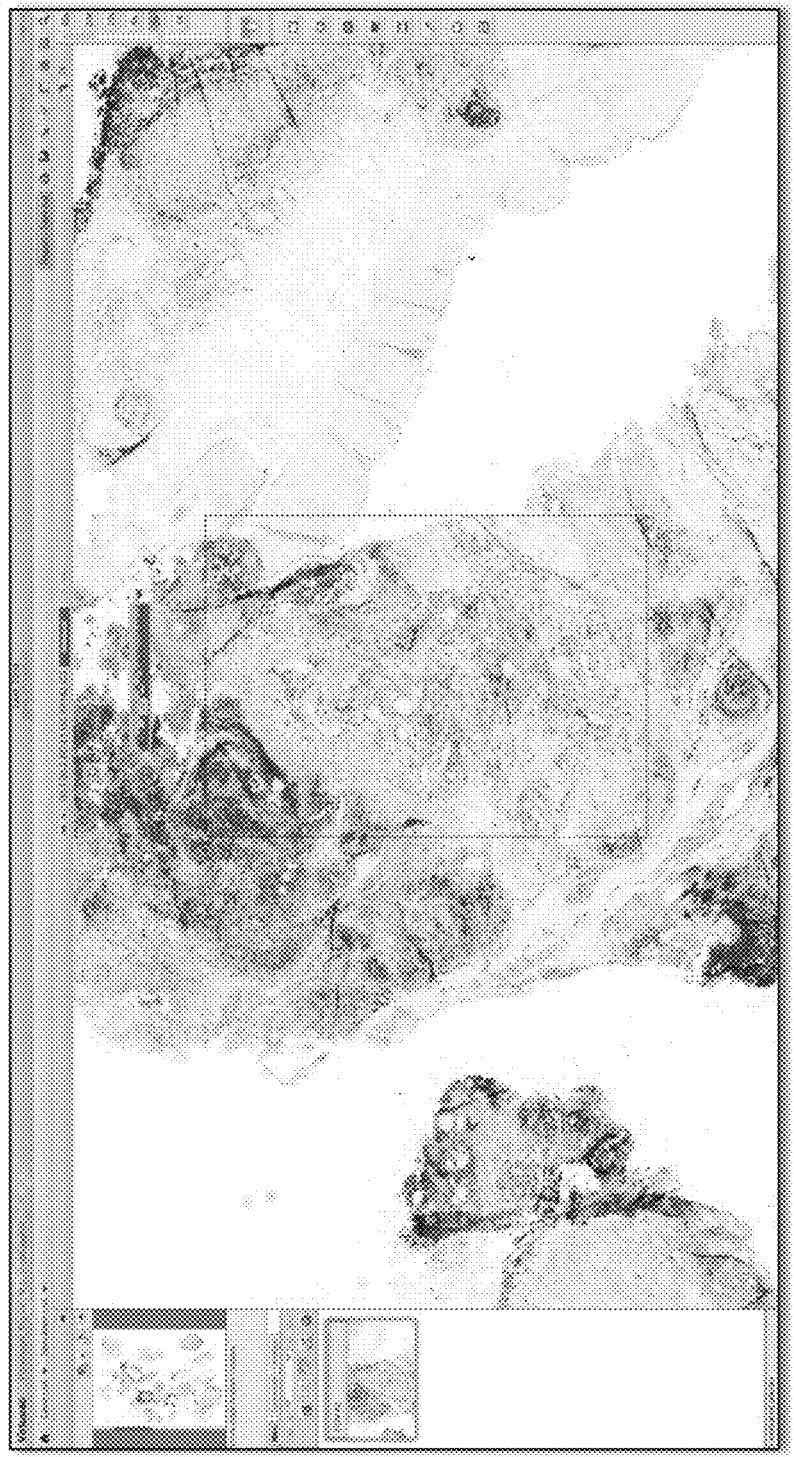
FIGS. 19 and 20 are exemplary screen shots of an exemplary colored overlay at a 2× magnification power level (FIG. 19) and at a 10× magnification power level (FIG. 20)
Figure 20:

FIGS. 19 and 20 are exemplary screen shots 1900, 2000, respectively, of an exemplary colored overlay at a 2× magnification power level (FIG. 19) and at a 10× magnification power level (FIG. 20).

Figure 2:
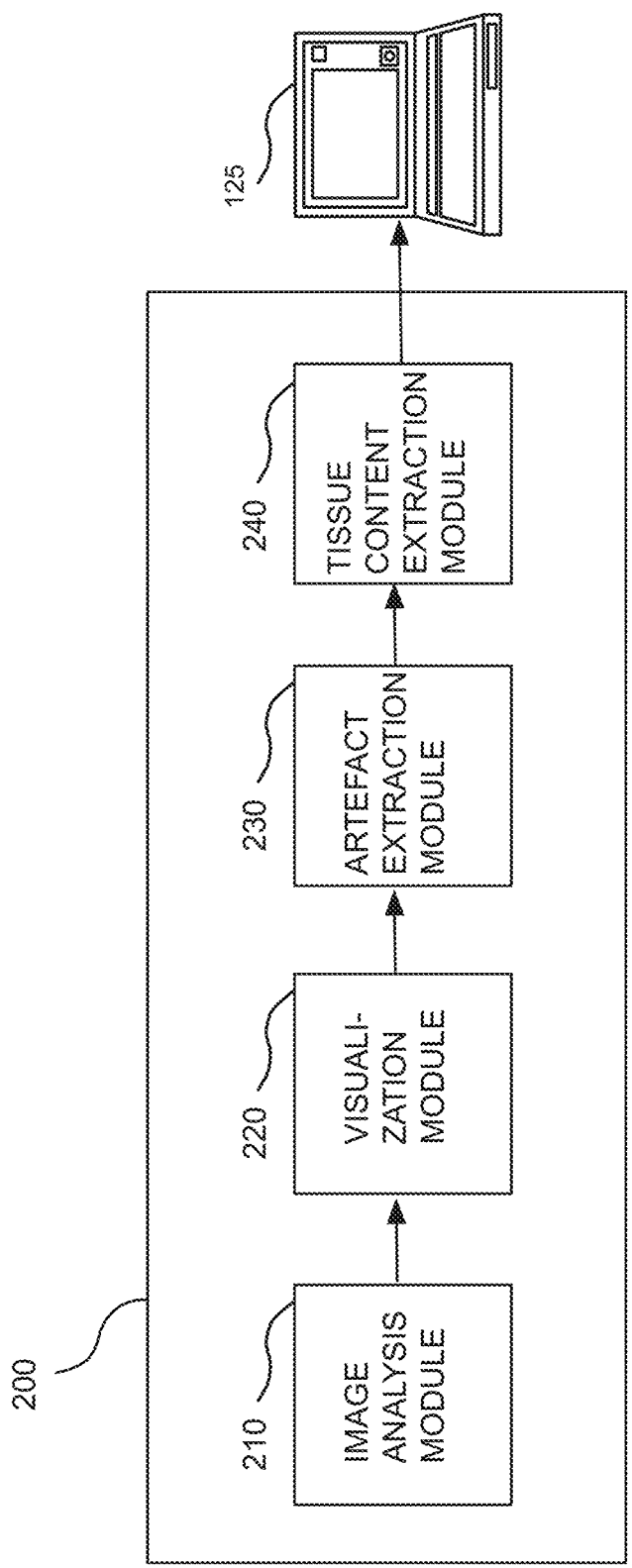
FIG. 2 is an exemplary overview block diagram of the workflow module of FIG. 1.
Figure 4A:
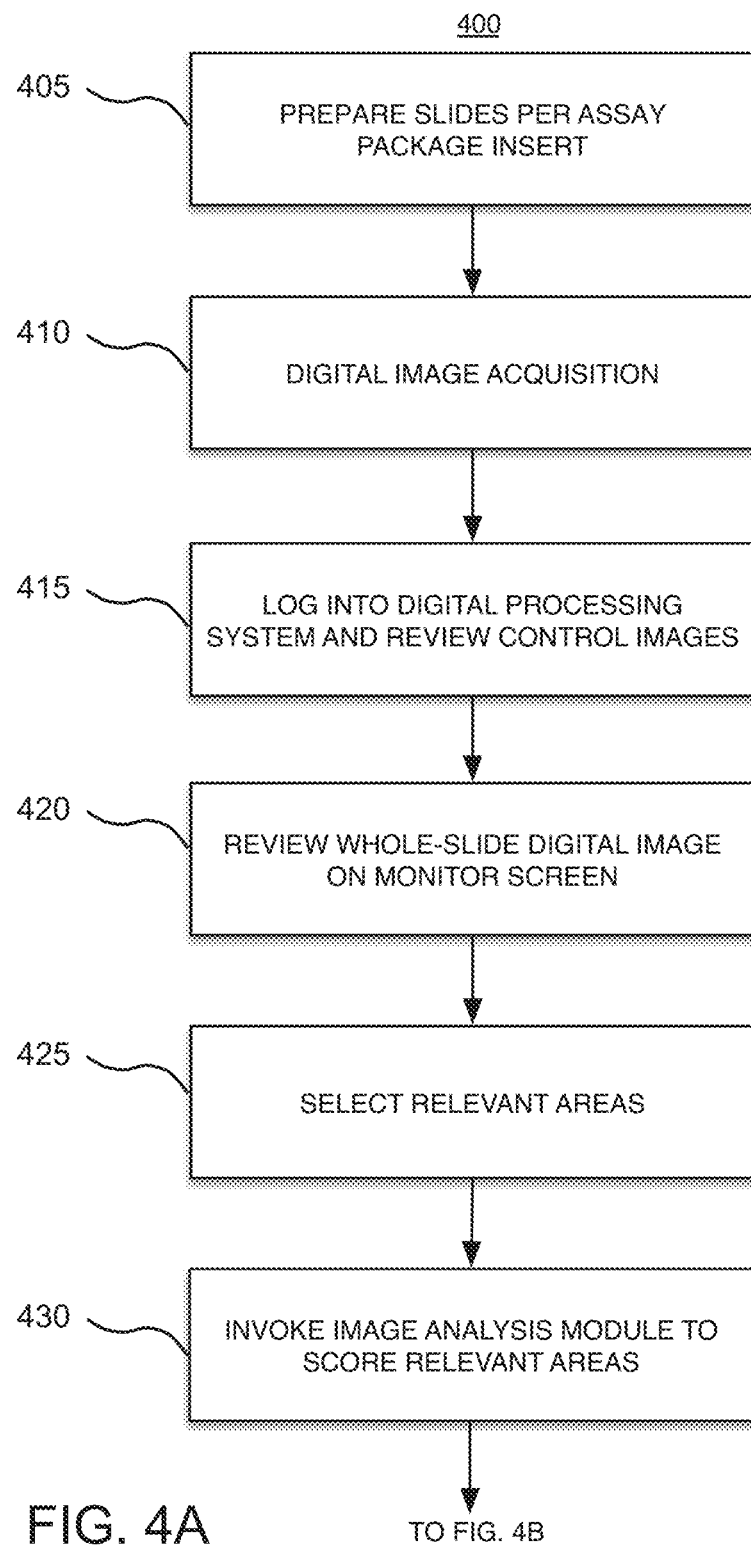
FIG. 4 is comprised of FIGS. 4A and 4B, and represents an exemplary flow chart of the overall operation of the workflow module of FIGS. 1 and 2, in accordance with an alternative embodiment of the present disclosure.
Figure 4B:
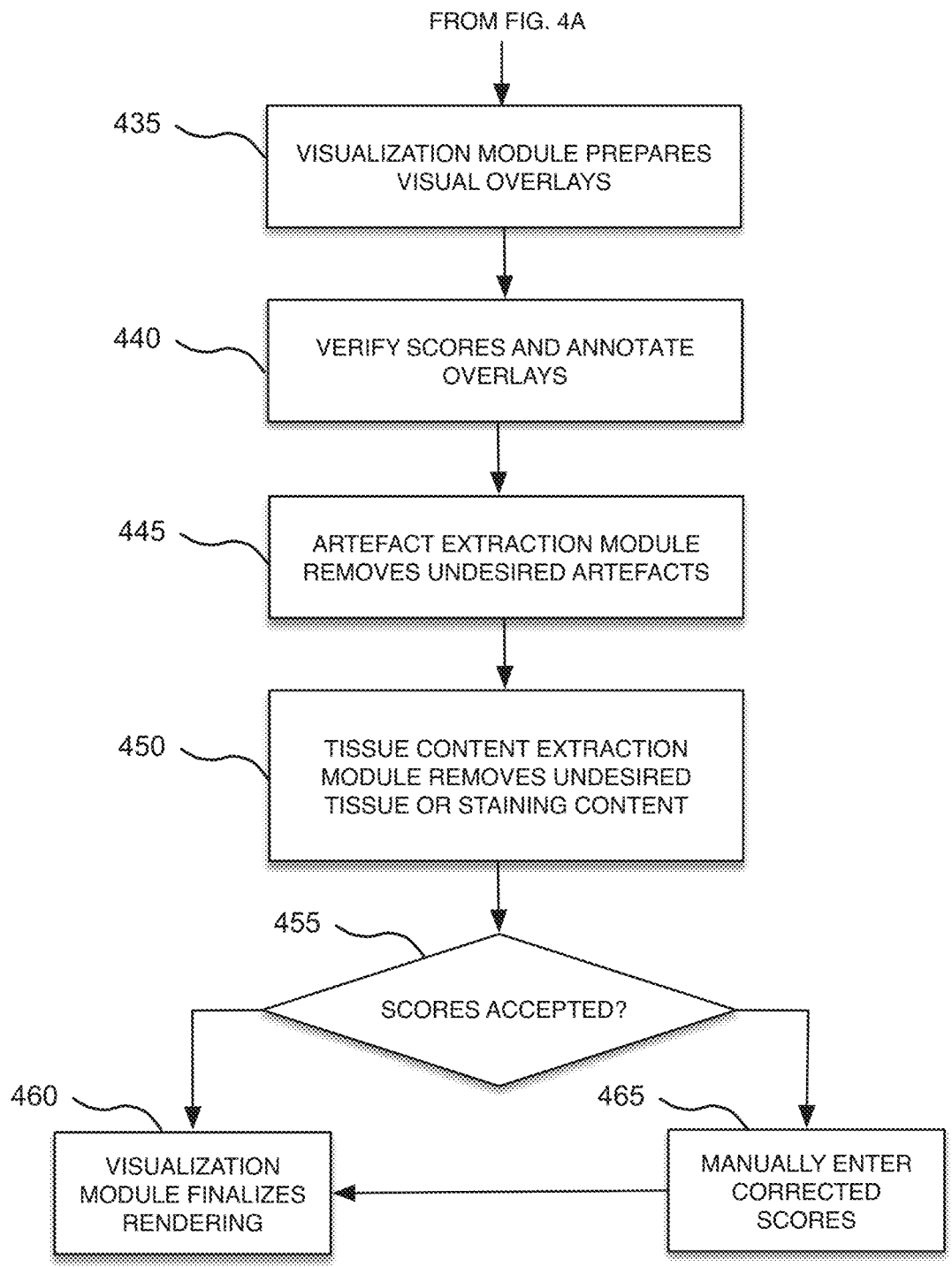

Considering now FIG. 4, it is comprised of FIGS. 4A and 4B, and represents a workflow 400 that is hosted on the workflow module 200 of FIGS. 1 and 2, in accordance with an alternative embodiment of the present disclosure. Similarly, to step 305, the workflow 400 starts at step 405 by preparing a digital pathology slide (or slides) pursuant to the appropriate assay guidelines, including staining the tissue sample.

At step 410, and similarly to step 310, the scanner 111 acquires a whole-slide image (or images) 500 (FIG. 5) of the sample tissue, before the user starts analyzing a case. The scanned digital image 500 can be viewed and assessed by the user at various magnification levels. This digital image 500 may be stored and accessed on the databases 150. The batch control is also scanned and available for review.

At step 415, the user logs into the digital pathology system 100 and reviews the stored control images. In addition, at step 420, the user reviews the digital image 500 of the stained slide without the benefit of the image analysis that is provided by the workflow module 200.

At step 425, the user separates the relevant areas from the non-relevant areas in the whole-slide digital image 500. To this end, the user uses the digital pathology system 100 to manually select the relevant areas of interest by, for example, outlining the relevant areas. Each relevant area may selectively be viewed at a different magnification level.

It should be amply clear that the user is no longer restricted by specific geometric shapes, such as a rectangle, for defining and selecting the relevant areas of interest in the tissue sample. Rather, the present digital pathology system enables the user to perform a freehand selection of large relevant areas in the tissue sample, by outlining these relevant areas, such as by manually drawing a boundary 1010 around the relevant areas of interest 1020, as explained earlier in connection with FIG. 10.

It should also be understood that other manual selection methods might be used. As an example, the user is enabled to annotate the whole-slide digital image in order to specify the areas of interest that require scoring. Alternatively, the selection process of the relevant areas could be performed automatically by the digital pathology system 100. For example, digital pathology system 100 may automatically detect one or more areas within the whole-slide digital image containing tumor (e.g., based on any known machine-learning or deep-learning technique, such as using a neural network trained to detect tumor areas) and designate such area(s) as relevant areas.

Once the selection of the relevant areas is completed at step 420, the workflow 400 proceeds to step 430, to enable the user to invoke the image analysis module 210 of the workflow module 200, in order to initiate an image analysis algorithm of the selected relevant areas 1010. The image analysis module 210 provides clinical scores based on cell detection and classification in the form of a percent positive immune cell score, ranging between 0 and 100. The scoring results represent large amounts of biological information, such as cell type, location, density, formation, etc.

At step 435 of FIG. 4B, the visualization module 220 responds to the user's instructions and prepares computer-generated overlays 1120 (FIG. 11) of the image analysis results, and provides the user with a user-friendly visual rendering 1100 of the scoring results atop the originally selected whole-slide image, as a representation of density. The overlays can represent one or more maps, such as a heat map, a location map, a correlation map etc., and can show variations of information depending on the application, as explained earlier in connection with step 335.

At step 440, the user verifies the resulting scores and annotates the visual rendering 1100, as needed.

At step 445, the user invokes the artefact extraction module 230 (FIG. 2) which enables the user to select undesired image artefacts, such as folds, stroma separation artefact, speckling, etc. To this end, the user may either perform the selection by manually outlining the undesired artefacts (or artefact areas), or by implementing an automated method that detects, visualizes these undesired artefacts. The artefact extraction module 230 then excludes the undesired artefacts from the resulting image analysis and visualization by the image analysis module 210 and the visualization module 220.

At step 450, the user invokes the tissue content extraction module 240 (FIG. 2) which enables the removal of undesired tissue and staining content, such as anthracotic pigment, necrosis, intra-vascular neutrophils, etc. To this end, the user may either perform the selection by manually outlining the undesired content areas, or by implementing an automated method that detects, visualizes these undesired content areas. The tissue content extraction module 240 then excludes the undesired artefacts from the resulting image analysis and visualization by the image analysis module 210 and the visualization module 220.

At decision step 455, the user determines whether or not to accept the scoring results generated by the workflow module 200. If the scoring results are accepted, then the workflow module 200 finalizes the digital rendering at step 460. The user will then sign out the case, and the selected results provided by the workflow module 200 are incorporated into a report.

If, however, the user selects override or revision of the scoring results at step 455, the workflow 400 proceeds to step 465, and enters the revised scores. The workflow module 200 continues to iterate the user input until the user is fully satisfied with the final digital rendering. The final digital rendering is then finalized and the final results provided by the workflow module 200 are incorporated into a report at step 460. The user will then sign out the case, and the report will be made available to a professional practitioner for the intended purpose.

It should be clear that the present disclosure is not limited to the detection and visualization of one type of cells, but it can rather analyze entire tumor areas containing various types of cells. Each type of cell may be visualized with a different color.

The whole-slide heat map visualization process of the present disclosure will now be described in more detail, in connection with FIGS. 21 through 26. In general, the whole-slide heat map overlay is a method of visualizing digital pathology images in order to show areas where a higher density or cluster of biomarker expression occurs. The heat map visualization process provides the user with the ability to visually perceive the density of biomarker expression independently of the zoom factor at low image magnification (e.g., 4×). The whole-slide heat maps are generated at low magnification to indicate the density of the cell detection results from the whole-slide image. A color gradient is used to indicate areas of increasingly higher density, wherein each cell is assigned a density value and the entire layer is visualized using a gradient. The interpolation of discrete points creates a continuous surface that is referred to as a density surface. The end visualization which affects how the data is interpreted by the viewer is subjective.

Figure 21:
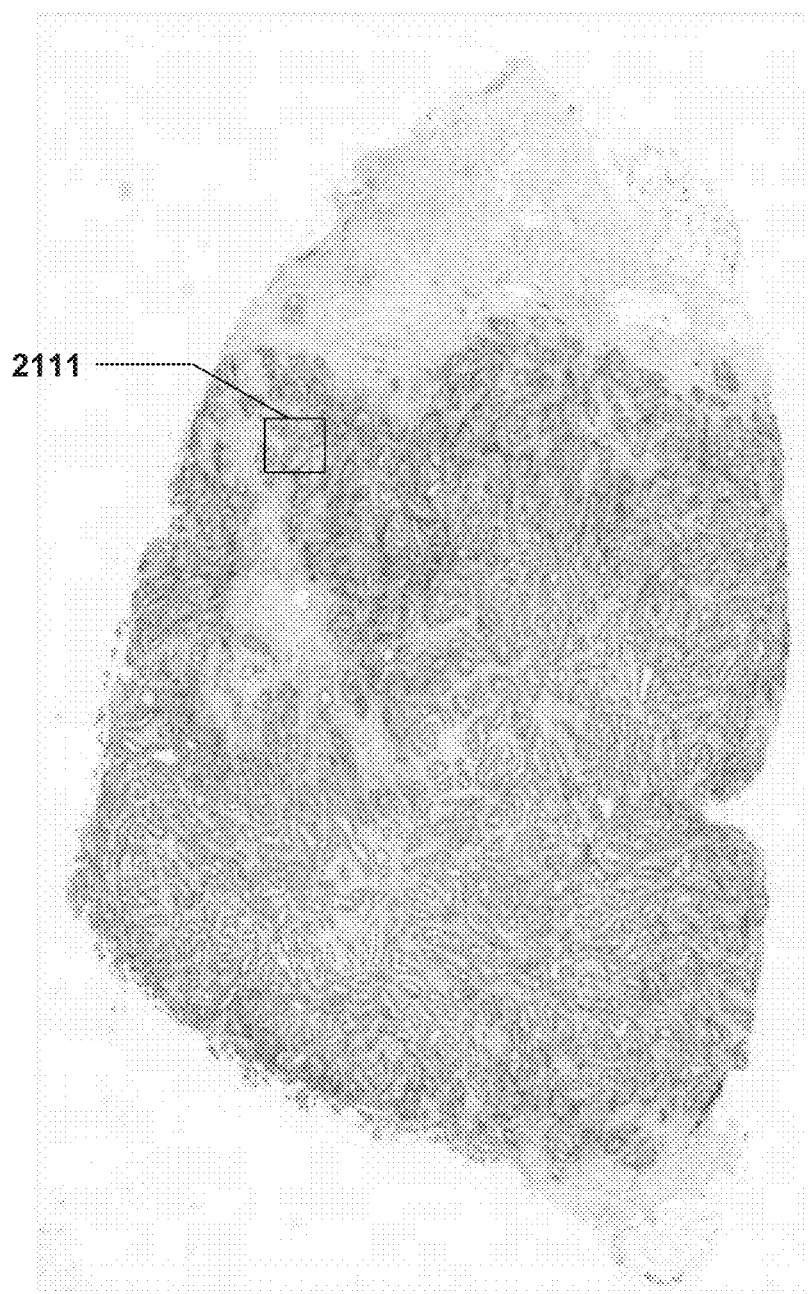
FIGS. 21-26 illustrate exemplary views of the whole-slide heat map visualization process of the present disclosure.
Figure 22:
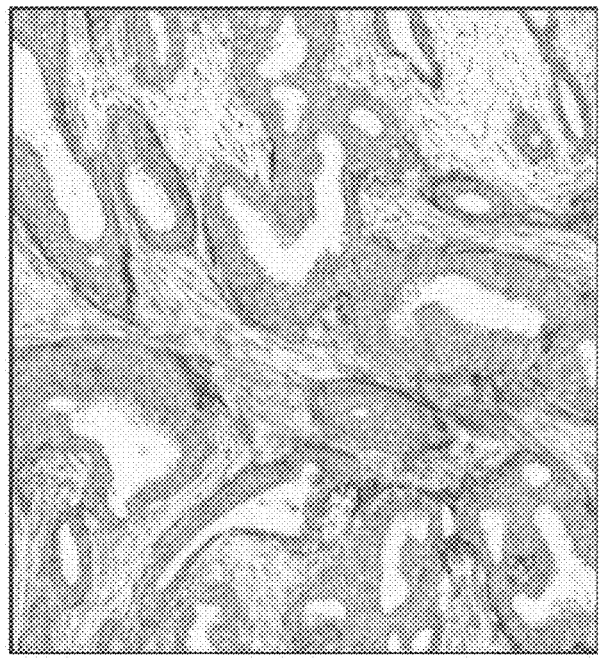

FIGS. 21 through 24 illustrate examples of a digital pathology image 2100 (FIG. 21) that comprises a clinically relevant morphology (or area of interest to the user) 2111. FIG. 21 shows the clinically relevant morphology 2111 at a low magnification level, while FIG. 22 illustrates a highly magnified view of this clinically relevant morphology 2111. While the clinically relevant morphology 2111 is illustrated as having a generally square shape, it should be understood that the user may select the morphology of interest using either regular or irregular contours.

Figure 23:
Figure 24:
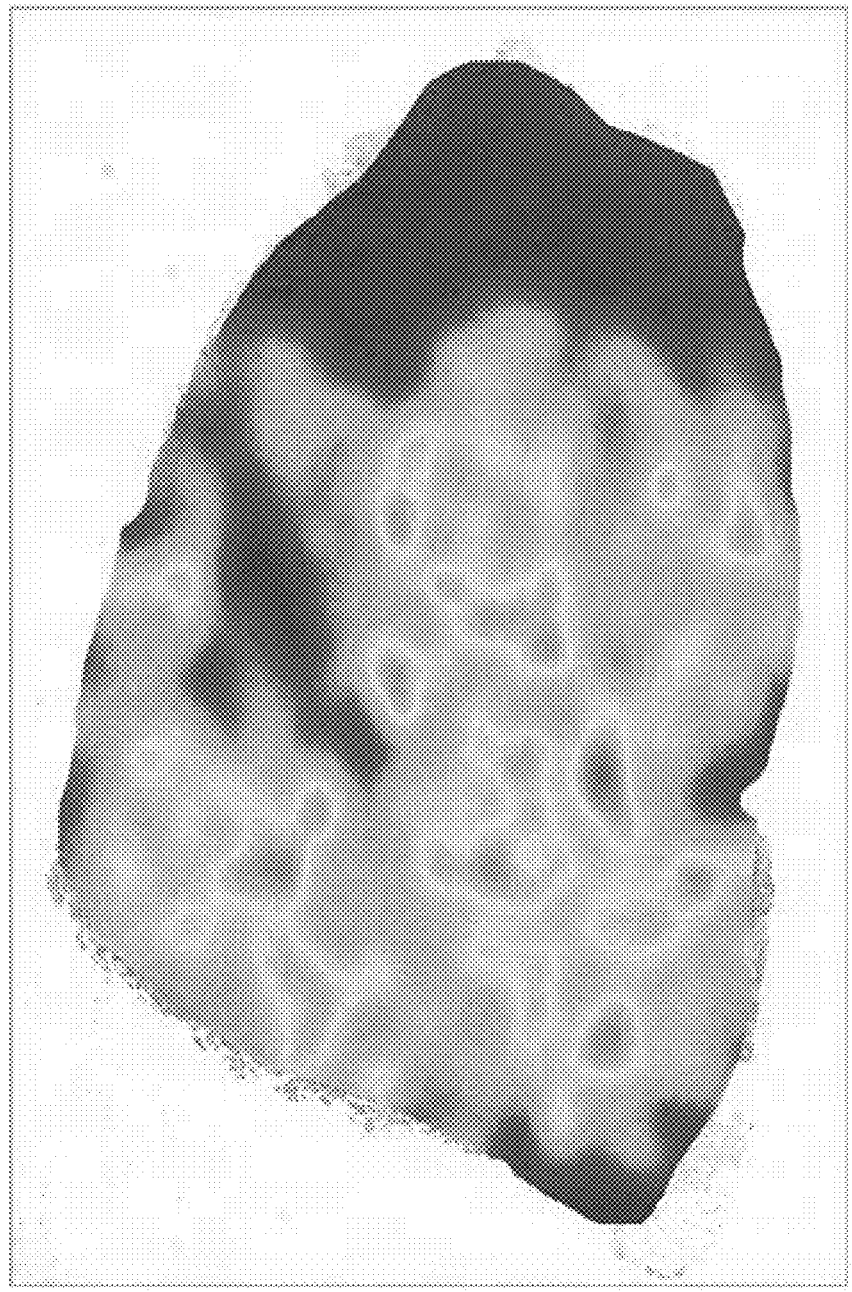

The image analysis algorithm that is embedded on the image analysis module 210 of the workflow module 200 is performed onto the clinically relevant morphology 2111 of FIG. 22, to provide the cell detection results (or map) 2300, which is shown in FIG. 23 as green dots 2323. After obtaining the cell detection results for the whole-slide image, the cell detection results are used to generate the whole-slide heat map (or heat map overlay) 2400 (FIG. 24) corresponding to the density of the biomarker expression. FIG. 24 shows the whole-slide heat map overlay 2400 on the original whole-slide image 2100 (FIG. 21). The color gradient is used to indicate areas of increasingly higher density.

In addition to heat map concept of visualizing the density of biomarker expression, the present disclosure describes a visualization process that enables the detection and identification of multiple cell types within the whole-slide 2100. Rather than using color to provide an indication of the quantity of a biomarker expression in the tissue, color will now be used to represent cell types, such as tumor or immune cells, and whether they express for a certain biomarker or not, i.e., positive or negative.

Figure 25:
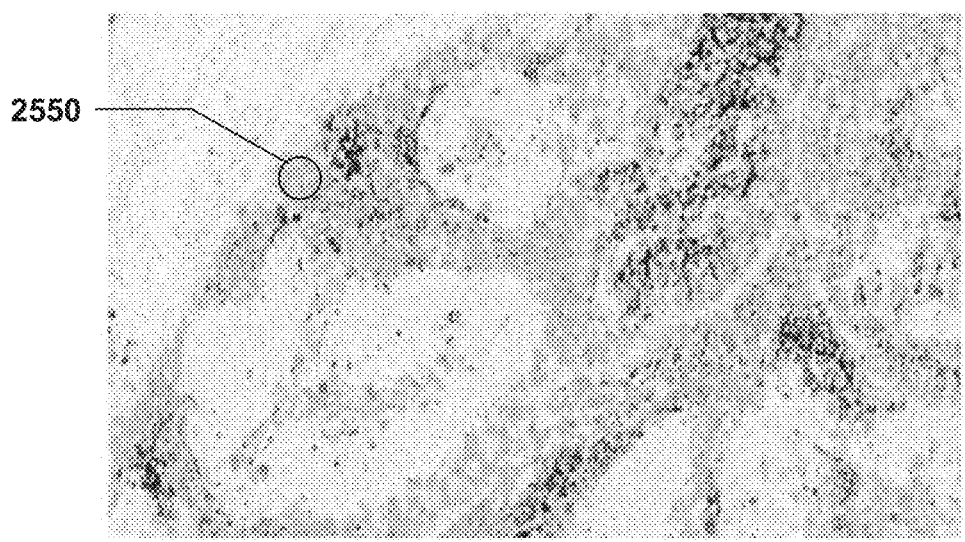
Figure 26:
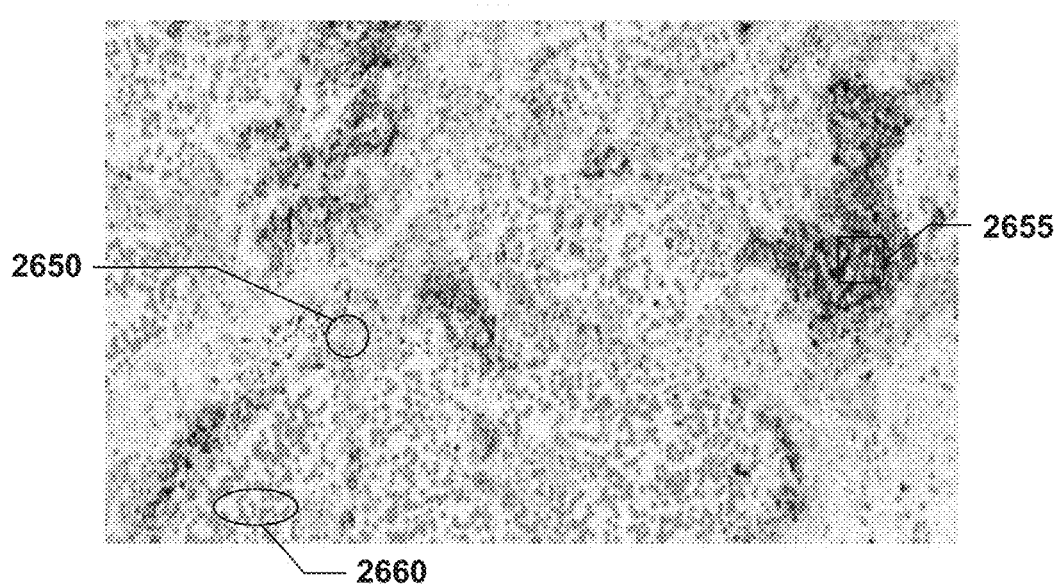

FIGS. 25, 26 visualize examples for a bladder and lung cancer tissue where PD-L1 positive immune cells as well as PD-L1 positive/negative tumor cells are visualized as detected by the image analysis algorithm of the present disclosure. In this case, each cell type is assigned a different color and the density of each cell type is visualized by using a color intensity gradient that smoothly assigns a lower color intensity value to locations further away from the center location of the respective cell type. Consequently, high density areas will be represented by a continuously strong color region and areas of mixed cell types will be represented by new colors that result from contributions of all different cell types in the surrounding area.

FIG. 25 illustrates an example of positive immune cells 2550 detected on a PD-L1 bladder slide 2500. These positive immune cells 2550 are represented by the green areas. FIG. 26 illustrates an example of PD-L1 positive immune cells 2650 (green areas), PD-L1 positive tumor cells 2655 (red areas), and PD-L1 negative immune cells 2660 (blue areas). Higher density areas of a certain cell type appear grouped and mixed areas appear in mixed color.

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, the use of a specific sequence of steps is not meant to imply any limitations on the disclosure. Changes may be made with regards to the sequence of steps without departing from the spirit or scope of the present disclosure. The use of a particular sequence is therefore, not to be taken in a limiting sense, and the scope of the present disclosure is defined only by the appended claims.

As it will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As it will be further appreciated, the processes in embodiments of the present disclosure may be implemented using any combination of software, firmware or hardware. As a preparatory step to practicing the disclosure in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present disclosure are described in the context of a fully functional computer (server) system with installed (or executed) software, those skilled in the art will appreciate that the software aspects of the illustrative embodiments of the present disclosure are capable of being distributed as a program product in a variety of forms, and that an illustrative embodiment of the present disclosure applies equally regardless of the particular type of media used to actually carry out the distribution.

In addition, while the present disclosure has been described with reference to exemplary embodiments, it will be understood by those skilled in the art that various changes may be made and equivalents may be substituted for elements thereof without departing from the scope of the disclosure. Furthermore, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a", "b", c", "first", "second", and "third" are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A digital pathology system comprising:
   an image analysis module configured to:
      determine that an image of a tissue slide is scanned and available for image analysis,
      based on the determination that the image is scanned and available for image analysis, automatically perform image analysis of substantially all areas of the image that contain at least some tissue, and
      store results of the image analysis;
   a visualization module configured to:
      enable a user to view the image and to select an area of clinically relevant morphology within the image,
      in response to a selection of the area of clinically relevant morphology from the user, retrieve a subset of the stored results of the image analysis, the subset of stored results corresponding to the area of clinically relevant morphology, wherein the selected area of clinically relevant morphology corresponds to one or more parts of the image;
      use the subset of stored results to calculate and provide for display a set of one or more quantifiable scores representing biomarker expressions across the selected area of clinically relevant morphology, wherein the set of one or more quantifiable scores are calculated at least by excluding undesired tissue and staining content of the selected area of clinically relevant morphology; and
   a tissue content extraction module configured to:
      receive the selection of the area of clinically relevant morphology; and
      determine the undesired tissue and staining content for exclusion from the selected area of clinically relevant morphology.

2. The digital pathology system of claim 1, wherein the set of one or more quantifiable scores is a representation of a density of the biomarker expressions across the selected area of clinically relevant morphology.

3. The digital pathology system of claim 1, wherein the selected area of clinically relevant morphology includes at least one entire tumor area.

4. The digital pathology system of claim 1, wherein the selected area of clinically relevant morphology includes a plurality of different solid tumor areas.

5. The digital pathology system of claim 1, wherein the visualization module is further configured to add to the image a visual overlay representing the biomarker expressions across the selected area of clinically relevant morphology.

6. The digital pathology system of claim 5, wherein the visual overlay comprises at least one of a heat map, a location map, and a correlation map.

7. The digital pathology system of claim 5, wherein the visualization module is further configured to receive an additional user input and to revise the visual overlay in accordance with the additional user input.

8. The digital pathology system of claim 1, wherein the image analysis module is configured to perform the image analysis within a predetermined time after the image of the tissue slide is scanned, and before the user first views the image.

9. The digital pathology system of claim 1, wherein the stored results of the image analysis comprise locations and/or types of a plurality of cells within the substantially all areas of the image that contain at least some tissue.

10. The digital pathology system of claim 9, wherein the image analysis further comprises generating at least one overlay image based on the locations and types of the plurality of cells, and storing the at least one overlay image.

11. The digital pathology system of claim 1, wherein the tissue content extraction module is further configured to determine undesired image artefacts for exclusion for the visualization module, wherein the undesired image artefacts include a fold, a stroma separation artefact, a speckling, or combinations thereof.

12. The digital pathology system of claim 1, wherein the undesired tissue and staining content comprises an anthracotic pigment, a necrosis, an intra-vascular neutrophils, or combinations thereof.

13. The digital pathology system of claim 1, wherein the image analysis module is further configured to automatically detect the area of clinically relevant morphology using an artificial neural network trained to detect tumor areas.

14. The digital pathology system of claim 1, wherein the undesired tissue and staining content is determined by identifying at least part of the tissue depicted in the selected area of clinically relevant morphology, wherein the at least part of the tissue corresponds to a histological feature of a plurality of histological features.

15. A method comprising:
automatically determining that an image of a tissue slide is scanned and available for image analysis;
based on the determination that the image is scanned and available for image analysis, automatically performing image analysis of substantially all areas of the image that contain at least some tissue;
storing results of the image analysis;
obtaining, from a user, a selection of an area of interest within the image, wherein the selected area of interest corresponds to one or more parts of the image;
in response to the selection of the area of interest:
determining undesired tissue and staining content for exclusion from the selected area of interest; and
retrieving a subset of the stored results of the image analysis, the subset of stored results corresponding to the selected area of interest; and
using the subset of stored results to calculate and provide for display a set of one or more quantifiable scores representing biomarker expressions across the selected area of interest, wherein the set of one or more quantifiable scores are calculated at least by excluding the determined undesired tissue and staining content.

16. The method of claim 15, further comprising:
overlaying on top of the image a visual overlay representing the biomarker expressions across the selected area of interest, wherein the visual overlay comprises at least one of: a heat map, a location map, and a correlation map.

17. The method of claim 15, wherein the image analysis is performed within a predetermined time after the image of the tissue slide is scanned, and before the user first views the image.

18. The method of claim 15, wherein the stored results of the image analysis comprise locations and/or types of a plurality of cells within the substantially all areas of the image that contain at least some tissue.

19. A non-transitory computer-readable medium storing instructions which, when executed by one or more processors by a digital pathology system, cause the digital pathology system to perform operations comprising:
automatically determining that an image of a tissue slide is scanned and available for image analysis;
based on the determination that the image is scanned and available for image analysis, automatically performing image analysis of substantially all areas of the image that contain at least some tissue;
storing results of the image analysis;
obtaining, from a user, a selection of an area of interest within the image, wherein the selected area of interest corresponds to one or more parts of the image;
in response to the user's selection of the area of interest:
determining undesired tissue and staining content for exclusion from the selected area of interest; and
retrieving a subset of the stored results of the image analysis, the subset of stored results corresponding to the selected area of interest; and
using the subset of stored results to calculate and provide for display a set of one or more quantifiable scores representing biomarker expressions across the selected area of interest, wherein the set of one or more quantifiable scores are calculated at least by excluding the determined undesired tissue and staining content.

20. The non-transitory computer-readable medium of claim 19, wherein the stored results of the image analysis comprise locations and/or types of a plurality of cells within the substantially all areas of the image that contain at least some tissue.

* * * * *